(12) United States Patent
Kudo

(10) Patent No.: US 8,553,061 B2
(45) Date of Patent: Oct. 8, 2013

(54) OPTICAL SCANNING DEVICE AND IMAGE FORMING APPARATUS USING THE SAME

(75) Inventor: Genichiro Kudo, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 1136 days.

(21) Appl. No.: 12/046,591

(22) Filed: Mar. 12, 2008

(65) Prior Publication Data
US 2008/0225105 A1 Sep. 18, 2008

(30) Foreign Application Priority Data
Mar. 13, 2007 (JP) ................. 2007-063324

(51) Int. Cl.
*B41J 29/13* (2006.01)
*G03G 21/00* (2006.01)
*B41J 2/47* (2006.01)
*B41J 2/435* (2006.01)

(52) U.S. Cl.
USPC ........................................ 347/235

(58) Field of Classification Search
USPC ........................................ 347/235
See application file for complete search history.

(56) References Cited

U.S. PATENT DOCUMENTS

| | | | |
|---|---|---|---|
| 6,317,244 B1 | 11/2001 | Ishibe | |
| 7,253,827 B2 | 8/2007 | Ishihara | 347/235 |
| 2003/0234968 A1* | 12/2003 | Kudo | 359/204 |
| 2004/0160507 A1 | 8/2004 | Ishihara | 347/134 |
| 2007/0146738 A1* | 6/2007 | Nakajima | 358/1.4 |

FOREIGN PATENT DOCUMENTS

| | | |
|---|---|---|
| JP | 62-59506 | 10/1985 |
| JP | 2000-235154 | 8/2000 |
| JP | 2004-233824 | 8/2004 |

OTHER PUBLICATIONS

Notification of First Office Action, The Patent Office of the People's Republic of China, Jun. 19, 2009. (English translation thereof also included).
Extended European Search Report dated Jun. 19, 2008, mailed in a Communication dated Jun. 27, 2008, in copending European patent application No. 08 00 4586.

\* cited by examiner

*Primary Examiner* — Ryan Lepisto
*Assistant Examiner* — Erin Chiem
(74) *Attorney, Agent, or Firm* — Fitzpatrick, Cella, Harper & Scinto

(57) ABSTRACT

An optical scanning device includes a light source device having light emitting members of a number N (N is an integer not less than 2) disposed with a tilt with respect to a sub-scan direction and a main-scan direction, a deflecting device for scanningly deflecting light beams of the number N from the light emitting members, an input optical system for directing the light beams from the light source means to the deflecting device, an imaging optical system for directing the deflected light beams to a surface to be scanned, a synchronism signal detecting device for detecting a portion of a light beam scanningly deflected by the deflecting surface and producing writing start timing signals for the light beams upon the surface to be scanned, and a synchronism detecting optical system for directing the deflected light beams to the synchronism signal detecting device, wherein the synchronism signal detecting device detects a light beam emitted from a light emitting member among the light emitting members of the number N, except a light emitting member which emits a light beam that provides a least light quantity when the same is incident on the synchronism signal detecting device, to determine the writing start timing signal.

8 Claims, 13 Drawing Sheets

OPTICAL SCANNING DEVICE AND IMAGE FORMING APPARATUS USING THE SAME

FIELD OF THE INVENTION AND RELATED ART

This invention relates to an optical scanning device and an image forming apparatus using the same. The present invention is suitably usable in an image forming apparatus such as a laser beam printer, a digital copying machine or a multi-function printer, for example, having an electrophotographic process.

A variety of proposals have been made to optical scanning devices in which a plurality of light beams from light source means (multi-beam light source) having a plurality of light emitting members (light emission points) are focused as a spot on the surface of a photosensitive drum (photosensitive member) which is a surface to be scanned.

With regard to a method of detecting (synchronism detection) the writing start position in a main-scan direction on the scanned surface, in these optical scanning devices, generally there are two methods such as follows.

(a) A method in which the synchronism detection is performed by using light beams emitted from all the light emitting members (see Patent Documents Nos. 1 and 2 below); and (b) A method in which the synchronism detection is performed by using a light beam emitted from only one light emitting member, among the plural light beams from all the light emitting members, which member is disposed at a scan upstream side (scan start side) (see Patent Document No. 3 below).

In any of these methods (a) and (b), as for the synchronism detecting light beam for detecting the writing start position in the main-scan direction on the scanned surface, it is necessary to use a light beam which is directed to the outside of an image effective region.

Consequently, it is necessary to enlarge the diameter of a rotary polygonal mirror (polygon mirror) which is an optical deflector, so that the synchronism detecting light beam is not eclipsed by the deflecting surface of the rotary polygonal mirror.

As a result, in optical scanning devices using a multi-beam light source, it is difficult to reduce the size of the device.

If the quantity of eclipse of the synchronism detecting light beam is large, the starting and ending characteristics of the detection operation of the synchronism detecting sensor (synchronism signal detecting means) are worsened by the light quantity decrease as discussed in Patent Document No. 1, which causes a problem of dispersed detection timing.

As described above, if the light quantity of the synchronism detecting light beam decreases, it causes deviation of the printing position in the main-scan direction on the surface being scanned. This leads to degradation of the image quality such as moiré or jitter.

Furthermore, in a color image forming apparatus in which a plurality of different images are superposed one upon another to perform image formation, the printing position deviation occurs in each color, to cause what is called a color drift.

PATENT DOCUMENTS

No. 1: Japanese Laid-Open Patent Application No. 2000-235154
No. 2: Japanese Laid-Open Patent Application No. 2004-233824
No. 3: Japanese Patent Publication No. 62-59506

The technique disclosed in Patent Documents Nos. 1 and 2 wherein synchronism detection is performed in accordance with the method (a), has several disadvantages such as follows.

(1) Since the synchronism detection is performed by using all the beams of the multiple beams, if the multi-beam light source has a large beam interval in the main-scan direction, it is necessary to enlarge the size of the rotary polygonal mirror (polygon mirror) to reduce the eclipse of the synchronism detecting light beam.

(2) If the multi-beam light source has a large beam interval in the main-scan direction, it is necessary for even such light beam having a large eclipse to perform the synchronism detection. Hence, the quantity of the light beam to be incident on the synchronism detecting sensor is lowered, and the print position deviation becomes larger. In order to avoid the problem, an expensive synchronism detecting sensor having a highest precision should be used.

(3) There should be some limitation in regard to the disposition of the light emitting members of the light source means or the magnification of the synchronism detecting optical system, so as to ensure that a plurality of light beams are not incident on the synchronism detecting sensor at the same time. This leads to smaller freedom for the optical system designing.

On the other hand, if the synchronism detection is performed by using only a light beam which is upstream in the main-scan direction, in accordance with the method (b) described above, there are inconveniences such as follows.

(1) In order to perform high-definition image formation, it is necessary to enlarge the diameter of a rotary polygonal mirror (polygon mirror) to avoid eclipse of the synchronism detecting light beam.

(2) In order to realize wider field-angle scan, it is necessary to perform the synchronism detection by use of a light beam of large eclipse amount.

Hence, the optical scanning device as a whole has to be enlarged in size as described above or an expensive synchronism detecting sensor having high precision has to be used.

SUMMARY OF THE INVENTION

The present invention provides an optical scanning device of simple structure by which printing position deviation in the main-scan direction on a scanned surface can be significantly reduced, and high-definition image can be formed. The present invention in another aspect thereof provides an image forming apparatus having such optical scanning device.

In accordance with an aspect of the present invention, there is provided an optical scanning device, comprising: light source means having a plurality of light emitting members of a number N (N is an integer not less than 2) disposed with a tilt with respect to a sub-scan direction and a main-scan direction; deflecting means having a deflecting surface and configured to scanningly deflect light beams of the number N emitted from the light emitting members of the number N; an input optical system configured to direct the light beams of the number N emitted from said light source means to said deflecting means; an imaging optical system configured to direct the light beams of the number N scanningly deflected by said deflecting surface of said deflecting means to a surface to be scanned; synchronism signal detecting means configured to detect a portion of a light beam scanningly deflected by said deflecting surface of said deflecting means and to produce writing start timing signals for the light beams of the number N, upon the surface to be scanned; and a synchronism detecting optical system configured to direct the light beams of the number N from said deflecting means to said synchronism signal detecting means; wherein said synchronism signal detecting means is arranged to detect a light beam emitted from a light emitting member among the light emitting members of the number N, except a light emitting member which emits a light beam that provides a least light quantity when the same is incident on said synchronism signal detecting means, and to determine the writing start timing signal.

In one preferred form of this aspect of the present invention, the deflecting means comprises a rotary polygonal mirror having a plurality of deflecting surfaces, and wherein the writing start timing signal is determined based on detecting a light beam, among the light beams from the light emitting members of the number N, from a light emitting member which lastly scans the surface to be scanned.

Where an image height for detecting the writing start timing of said synchronism detecting optical system when converted upon the surface to be scanned 12 is denoted by $Y_{BD}$, a maximum distance of the light emitting members of the number N of said light source mans in the main-scan direction is denoted by W, a focal length of said input optical system in a main-scan section is denoted by $f_{col}$, a focal length of said imaging optical system in the main-scan section is denoted by $f_{f\theta}$, and an effective image width on the surface to be scanned is denoted by $Y_W$, a condition $|Y_{BD}| \geq W \times f_{f\theta}/f_{col} + |Y_W/2|$ may be satisfied.

The synchronism signal detecting means may be arranged to detect a light beam emitted from a light emitting member, of the light emitting members of the number N, which emits a light beam that provides a largest light quantity when the same is incident on said synchronism signal detecting means, and to determine the writing start timing signal.

The writing start timing signals for those light beams not used for the detection of the writing start timing signal may be predetermined with reference to the writing start timing signal for the light beam with which the writing start timing signal is to be detected.

In the main-scan section, the light beam incident on said deflecting surface of said deflecting means may be wider than a width of said deflecting surface of said deflecting means in the main-scan direction.

In accordance with another aspect of the present invention, there is provided an image forming apparatus, comprising: an optical scanning device as recited above; a photosensitive member disposed at the surface to be scanned; a developing device for developing an electrostatic latent image formed on said photosensitive member with a light beam scanningly deflected by said optical scanning device, to produce a toner image; a transferring device for transferring the developed toner image onto a transfer material; and a fixing device for fixing the transferred toner image, on the transfer material.

In accordance with a further aspect of the present invention, there is provided an image forming apparatus, comprising: an optical scanning device as recited above; and a printer controller for converting code data supplied from an outside machine into an imagewise signal and for inputting the imagewise signal into said optical scanning device.

In accordance with a yet further aspect of the present invention, there is provided an optical scanning device, comprising: a plurality of light source means of a number M (M is an integer not less than 2) each having a plurality of light emitting members of a number N (N is an integer not less than 2) disposed with a tilt with respect to a sub-scan direction and a main-scan direction; deflecting means having a deflecting surface and configured to scanningly deflect light beams of a number N×M emitted from the light emitting members of the number N×M; an input optical system configured to direct the light beams of the number N×M emitted from said light source means to said deflecting means; an imaging optical system configured to direct the light beams of the number N×M scanningly deflected by said deflecting surface of said deflecting means to a surface to be scanned; synchronism signal detecting means configured to detect a portion of a light beam scanningly deflected by said deflecting surface of said deflecting means and to produce writing start timing signals for the light beams of the number N×M, upon the surface to be scanned; and a synchronism detecting optical system configured to direct the light beams of the number N×M from said deflecting means to said synchronism signal detecting means; wherein said synchronism signal detecting means is arranged to detect a light beam emitted from a light emitting member among the light emitting members of the number N, except a light emitting member which emits a light beam that provides a least light quantity when the same is incident on said synchronism signal detecting means, and to determine the writing start timing signal.

In accordance with a still further aspect of the present invention, there is provided an optical scanning device, comprising: light source means including a plurality of light source units of a number S (S is an integer not less than 2) disposed along a sub-scan direction and each having a plurality of light emitting members of a number N (N is an integer not less than 2) disposed with a tilt with respect to the sub-scan direction and a main-scan direction; deflecting means having a deflecting surface and configured to scanningly deflect light beams of a number N×S emitted from the light emitting members of the number N×S; an input optical system configured to direct the light beams of the number N×M emitted from said light source means to said deflecting means; an imaging optical system configured to direct the light beams of the number N×S scanningly deflected by said deflecting surface of said deflecting means to a surface to be scanned; synchronism signal detecting means configured to detect a portion of a light beam scanningly deflected by said deflecting surface of said deflecting means and to produce writing start timing signals for the light beams of the number N×S, upon the surface to be scanned; and a synchronism detecting optical system configured to direct the light beams of the number N×S from said deflecting means to said synchronism signal detecting means; wherein said synchronism signal detecting means is arranged to detect a light beam emitted from a light emitting member among the light emitting members of the number N, except a light emitting member which emits a light beam that provides a least light quantity when the same is incident on said synchronism signal detecting means, and to determine the writing start timing signal.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the attached drawings.

Embodiment 1

Figure 1:
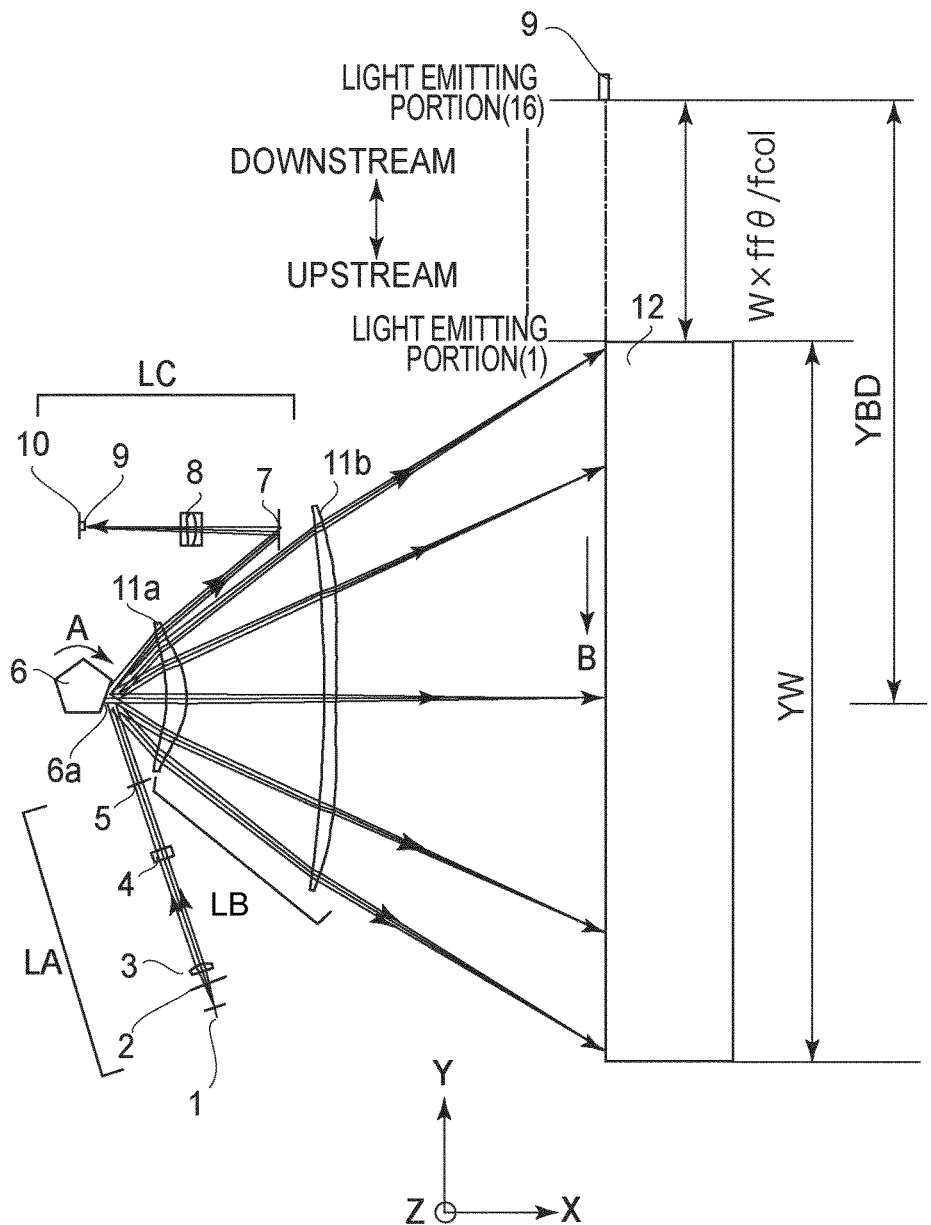
FIG. 1 is a main-scan sectional view of a first embodiment of the present invention.

FIG. 1 is a sectional view (main-scan sectional view) of a main portion of a first embodiment of the present invention, along a main-scan direction.

In the following description, the term "main-scan direction" (Y-direction) refers to a direction which is perpendicular to the axis of deflecting means and the optical axis of an imaging optical system (X-direction), i.e. the direction in which the light beam is reflectively deflected (scanningly deflected) by the deflecting means.

The term "sub-scan direction" (Z-direction) refers to a direction which is parallel to the axis of the deflecting means.

The term "main-scan section" refers to a plane which contains the main-scan direction and the optical axis of the imaging optical system.

The term "sub-scan section" refers to a section which is perpendicular to main-scan section.

Denoted in the diagram at 1 is light source means which comprises a VCSEL (plane emission laser) having light emitting members (light emission points) of a number N (N is an integer not less than 2) disposed along a straight direction (one-dimensional direction) with a tilt relative to the sub-scan direction and the main-scan direction, respectively.

Figure 2:
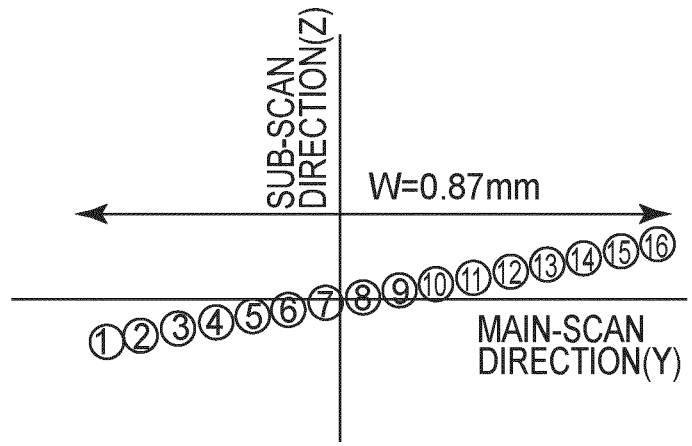
FIG. 2 is a diagram which shows light source means of the first embodiment of the present invention.

The light source means 1 of the present embodiment comprises, as shown in FIG. 2 to be described below, sixteen light emitting members (1)-(16) which are disposed along a straight direction with a tilt relative to the sub-scan direction and the main-scan direction, respectively.

Denoted at 2 is a first aperture stop which functions to regulate the light beams of a number N (16 in the present embodiment) emitted from the light source means 1, only with respect to the light beam width in the sub-scan direction.

Denoted at 3 is a collimator lens which functions to convert the light beams of a number N, passed through the aperture stop 2, into parallel light with respect to both the main-scan direction and the sub-scan direction.

Denoted at 4 is a cylindrical lens which has a refracting power only in the sub-scan direction.

Denoted at 5 is a second aperture stop which regulates the light beam width in the main-scan direction. It has an aperture width in the sub-scan direction, which is broader than the beam width.

The first aperture stop 2, collimator lens 3, cylindrical lens 4 and second aperture stop 5 are components of an input optical system LA which functions as a first optical means.

The function of the collimator lens 3 and the cylindrical lens 4 may be provided by a single optical element (anamorphic lens).

Denoted at 6 is an optical deflector as deflecting means, which comprises a rotary polygonal mirror (polygon mirror). It is rotated at a constant speed in the direction of an arrow A in the drawing, by driving means (not shown) which comprises a motor.

Denoted at LB is an imaging optical system (f-θ lens system) which comprises first and second imaging lenses 11a and 11b having an f-θ characteristic.

The imaging optical system LB is so structured that, in the sub-scan section, a conjugate relationship is provided between the deflecting surface 6a of the optical deflector 6 and the photosensitive drum surface 12 (scanned surface). With this arrangement, the surface tilt compensation for the optical deflector is accomplished. Denoted at 12 is a photosensitive member as the recording medium.

Denoted at 7 is a reflecting mirror for synchronism detection (hereinafter, "synchronism detecting mirror") which serves to reflect a light beam for synchronism detection (hereinafter, "synchronism detecting light beam") to a synchronism signal detecting means 10 side to be described below.

This synchronism detecting mirror 7 is provided to turn back the light beam directed to the synchronism signal detecting means 10, to thereby reduce the overall size of the system.

Denoted at 8 is an imaging lens for synchronism detection (hereinafter, "synchronism detecting lens") which functions to image the synchronism detecting light beam for determining the timing of the scan staring point on the photosensitive drum surface 12, upon a synchronism detecting slit 9 surface, to be described later, both in the main-scan section and the sub-scan section.

More specifically, within the main-scan section the synchronism detecting lens 8 functions to image the light beam upon the synchronism detecting slit 9 surface, while within the sub-scan section it serves to provide a conjugate relationship between the deflecting surface 6a of the optical deflector 6 and the synchronism detecting slit 9 surface, by which any surface tilt of the deflecting surface 6a of the optical deflector 6 is compensated.

Denoted at 9 is a slit for the synchronism detection, which is a synchronism detection determining means (hereinafter, "synchronism detecting slit"). It is disposed at an imaging position of the synchronism detecting lens 7.

The synchronism detecting slit 9 has a knife edge shape at its end portion, and determines the position where the spot imaged by the synchronism detecting lens 8 and being scanned in the main-scan direction is incident on the surface of the synchronism signal detecting means 10.

It should be noted here that the end portion of the synchronism detecting slit 9 is formed with a knife edge shape, and this is for the reason that the synchronism detecting precision is higher when the synchronism detecting light beam is eclipsed by the knife edge of synchronism detecting slit 9, than when it is eclipsed by the end portion of the light receiving surface of the synchronism signal detecting means 10.

However, even if the synchronism detecting slit 9 is not used but the end portion of synchronism signal detecting means 10 is used in substitution for the synchronism detecting slit 9, advantageous results of the present invention are still attainable.

Denoted at 10 is an optical sensor as synchronism signal detecting means (hereinafter, "synchronism detecting sensor") which functions to detect a portion of the light beam scanningly deflected by the optical deflector 6 to produce a writing start timing signal (synchronism signal) for the light beams of a number N (16) on the scanned surface 12.

Here, the synchronism detecting mirror 7, synchronism detecting lens 8 and synchronism detecting slit 9 are components of a synchronism detecting optical system LC (second optical means), and they serve to direct the sixteen light beams from the optical deflector 6 to the synchronism detecting sensor 10.

In the present embodiment, the sixteen light beams being optically modulated by the light source means 1 in accordance with the imagewise information and emitted from the same are incident on the aperture stop 2 by which the sectional size of the light beam is restricted. Then, these light beams are converted by the collimator lens 3 into parallel light which is then incident on the cylindrical lens 4.

Within the main-scan section, the light beams incident on the cylindrical lens 4 go outwardly without being changed.

The light beam width of the parallel light here is so set to be sufficiently wider in the main-scan direction than the facet width of the deflecting surface 6a of the optical deflector 6 (over-field optical system (OFS)).

Furthermore, within the sub-scan section, the light beam is converged and the sectional size of the light beam is restricted by the aperture stop 5, whereby it is imaged as a linear image (line image being elongated in the main-scan direction) on the deflecting surface 6a of the optical deflector 6.

Then, the sixteen light beams reflectively deflected by the deflecting surface 6a of the optical deflector 6 are imaged into a spot shape on the photosensitive drum surface 12 (scanned surface) by the first and second imaging lenses 11a and 11b.

Then, by rotating the optical deflector 6 in the direction of an arrow A, the photosensitive drum surface 12 is optically scanned at a constant speed in the direction of an arrow B (main-scan direction).

In this manner, the image recording is carried out on the photosensitive drum surface 12 (photosensitive member) which is a recording medium.

Here, in order that the timing of the scan starting position on the photosensitive drum surface 12 is determined before starting the optical scan of the photosensitive drum surface 12, the light beam reflectively deflected by the optical deflector 6 is collected on the synchronism detecting slit 9 surface by means of the synchronism detecting lens 8 and by way of the synchronism detecting mirror 7.

Then, based on the synchronism signal obtained by detecting an output signal from the synchronism detecting sensor 10, a timing signal for the scan staring position of the image recording on the photosensitive drum 12 surface is determined.

FIG. 2 is an enlarged view wherein the light source means 1 of the present embodiment is seen from the collimator lens 3 side.

In FIG. 2, the light emitting members (1) to (16) are provided by a plane emission laser (VCSEL) having sixteen light emitting members which are disposed equidistantly along a straight line. These light emitting members have intervals of 60 μm, and are disposed with a tilt of 15 deg. with respect to the Y axis so that the light beams from these light emitting members are positioned with intervals of 1200 dpi (21.2 μm) in the sub-scan direction on the photosensitive drum surface.

Figure 3:
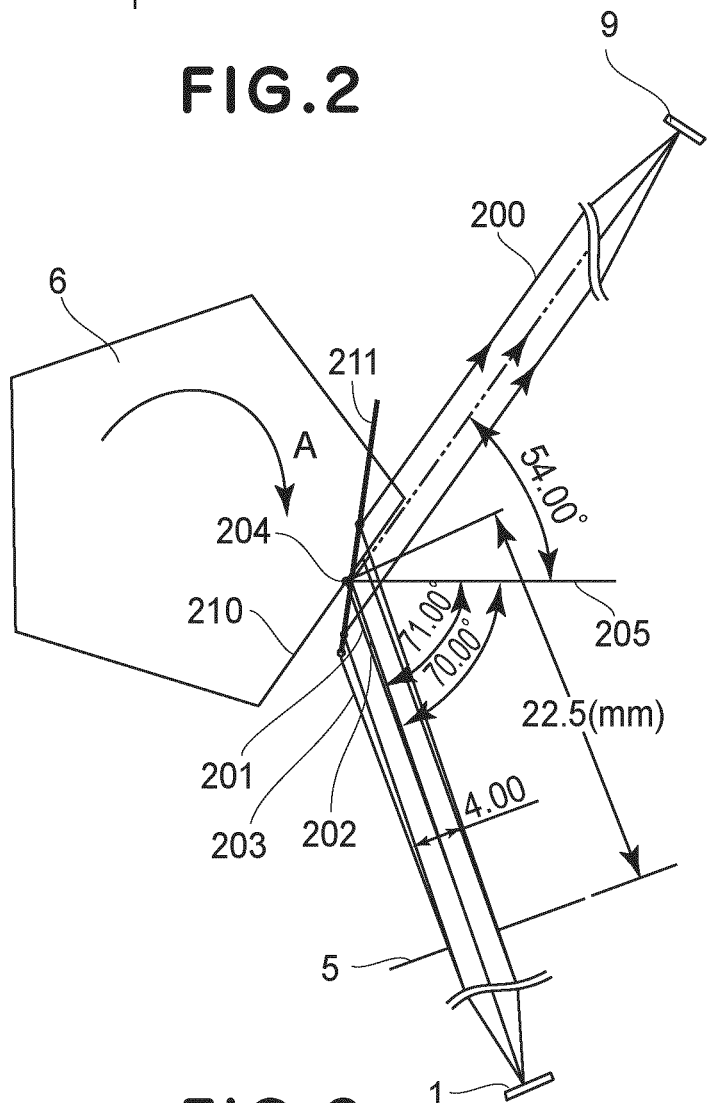
FIG. 3 is an enlarged view of a main portion of the first embodiment of the present invention.

FIG. 3 is the main-scan sectional view showing in an enlarged scale a portion around the optical deflector of the first embodiment of the present invention. Specifically, it illustrates the relationship between the light beam directed toward the synchronism detecting sensor and the deflecting surface of the optical deflector.

In FIG. 3, like numerals are assigned to components corresponding to those of FIG. 1.

In FIG. 3, denoted at 201 is an optical axis of the collimator lens 3, and denoted at 203 is a principal ray of the light beam emitted from the light emitting member (1) (i.e., the light ray passing through the center of the second aperture stop 5). Denoted at 202 is a light beam emitted from the light emitting member (16).

Denoted at 204 is the point of intersection between the optical axis 201 of the collimator lens 3 and the optical axis of the imaging optical system LB. This point will hereinafter be referred to as "axial deflection point".

Denoted at 205 is an optical axis of the imaging optical system LB, which is a straight line parallel to the principal ray of the light beam, directed toward the image center.

Illustrated at reference numeral 210 is the state of the deflecting surface which is deflecting the light beam advancing toward the image center.

Illustrated at reference numeral 211 is the state of the deflecting surface 6a which is deflecting the light beam advancing toward the center of the synchronism detecting slit 9.

In the present embodiment, the angle θ defined between the principal ray of the light beams emitted from the light emitting member (1) and light emitting member (16) and the optical axis 201 of the collimator lens 3, is equal to 1 deg.

The angle θ can be calculated based on the width W from the light emitting member (1) to light emitting member (16) in the main-scan direction and the focal length $f_{col}$ of the collimator lens 3, in accordance with the following equation.

$$\theta = \tan^{-1}\left(\frac{W}{2f_{col}}\right)$$

The light beam emitted from the light emitting member (1) and the light beam emitted from the light emitting member (16) are different from each other in the incidence angle (the angle defined between the optical axis 201 of the collimator lens 3 and the optical axis 205 of the imaging optical system LB).

Thus, upon the scanned surface 12, the light beam emitted from the light emitting member (1) is an upstream side light beam with respect to the scan direction, while the light beam emitted from the light emitting member (16) is a downstream side light beam with respect to the scan direction.

The light beam 203 emitted from the light emitting member (1) has an angle 1 deg. in an opposite direction to the light beam 202 emitted from the light emitting member (16), with reference to the optical axis 201. Thus, it is eclipsed at the deflecting surface 6a.

If the width of the light beam advancing toward the synchronism detecting sensor 10 becomes narrower than the width of the light beam emitted from the light emitting member (1), the spot diameter upon the synchronism detecting slit 9 becomes large and the light quantity decreases as well. Hence, the synchronism detecting precision deteriorates.

In consideration of this, in the present embodiment, the synchronism detection is carried out based on the light beam emitted from the light emitting member (16).

The light beam 200 to the synchronism detecting mirror 7 is emitted from the light source means 1, and the system is so configured that, as the deflecting surface 6a of the optical deflector 6 rotating in the direction of an arrow A is just in the state shown at 211, the light beam is deflected with a scan angle 54 deg. toward the center of the synchronism detecting slit 9.

Here, the scan angle is the angle which is defined between the principal ray of the light beam 200 and the optical axis 205 of the imaging optical system LB.

It should be noted that the second aperture stop 5 of the present embodiment is disposed at a position of 22.5 mm from the axial deflection point 204 (the point of intersection between the optical axis 201 of the collimator lens 3 and the optical axis 205 of the imaging optical system LB).

The design values of the optical scanning device according to the present embodiment are shown in Table 1 below.

TABLE 1

| | |
|---|---|
| Used wavelength (mm) | 6.70E−07 |
| f-θ lens refractive index | 1.527275 |
| No. of polygon surfaces | 5 |
| Polygon circumscribing radius (mm) | 34 |
| Polygon rotational angle (plus/minus deg.) | 24 |
| Main-scan direction incidence angle (deg.) | 70 |
| Sub-scan direction incidence angle (deg.) | 0 |
| Deflection point - GIR1 (mm) | 2.75E+01 |
| f-θ lens focal length (mm) | 2.00E+02 |

| | Polygon rotational center coordinates when the deflection point on the axial principal ray is taken as zero |
|---|---|
| X | −11.687 |
| Y | 5.877 |

| Type | | R1 surface | | R2 surface | |
|---|---|---|---|---|---|
| ST2 | | Scan starting side (s) | Scan ending side (e) | Scan starting side (s) | Scan ending side (e) |
| Main scan | d | 9.50E+00 | | d | 6.800E+01 |
| | R | −6.96E+01 | | R | −4.09E+01 |
| | K | −3.88E−02 | K  −3.88E−02 | K  −9.08E−01 | K  −9.08E−01 |
| | B4 | 2.15E−06 | B4  2.15E−06 | B4  7.20E−07 | B4  7.20E−07 |
| | B6 | 7.40E−10 | B6  7.40E−10 | B6  1.02E−10 | B6  1.02E−10 |
| | B8 | −5.61E−13 | B8  −5.6E−13 | B8  1.17E−12 | B8  1.17E−12 |
| | B10 | 0.00E+00 | B10  3.76E−17 | B10  −6.64E−16 | B10  −6.64E−16 |
| Sub scan | r | 0.00E+00 | r | r  0.00E+00 | r |
| | D2 | 0.00E+00 | D2  0.00E+00 | D2  0.00E+00 | D2  0.00E+00 |
| | D4 | 0.00E+00 | D4  0.00E+00 | D4  0.00E+00 | D4  0.00E+00 |
| | D6 | 0.00E+00 | D6  0.00E+00 | D6  0.00E+00 | D6  0.00E+00 |
| | D8 | 0.00E+00 | D8  0.00E+00 | D8  0.00E+00 | D8  0.00E+00 |
| | D10 | 0.00E+00 | D10  0.00E+00 | D10  0.00E+00 | D10  0.00E+00 |

| Type | | R3 surface | | R4 surface | |
|---|---|---|---|---|---|
| ST2 | | Scan starting side (s) | Scan ending side (e) | Scan starting side (s) | Scan ending side (e) |
| Main scan | d | 5.50E+00 | | d | 1.25E+02 |
| | R | −6.76E+02 | | R | 7.58E+02 |
| | K | 7.89E+00 | K  0.00E+00 | K  −9.83E+02 | K  −9.83E+02 |
| | B4 | 0.00E+00 | B4  0.00E+00 | B4  −2.48E−07 | B4  −2.48E−07 |
| | B6 | 0.00E+00 | B6  0.00E+00 | B6  1.81E−11 | B6  1.81E−11 |
| | B8 | 0.00E+00 | B8  0.00E+00 | B8  −1.23E−15 | B8  −1.23E−15 |
| | B10 | 0.00E+00 | B10  0.00E+00 | B10  4.22E−20 | B10  4.22E−20 |
| Sub scan | r | 0.00E+00 | r | r  −4.48E+01 | r |
| | D2 | 0.00E+00 | D2  0.00E+00 | D2  8.18E−05 | D2  7.05E−05 |
| | D4 | 0.00E+00 | D4  0.00E+00 | D4  −1.46E−08 | D4  −1.15E−08 |
| | D6 | 0.00E+00 | D6  0.00E+00 | D6  1.10E−12 | D6  6.89E−13 |
| | D8 | 0.00E+00 | D8  0.00E+00 | D8  3.03E−17 | D8  4.22E−17 |
| | D10 | 0.00E+00 | D10  0.00E+00 | D10  −6.21E−21 | D10  −5.10E−21 |

Figure 4:
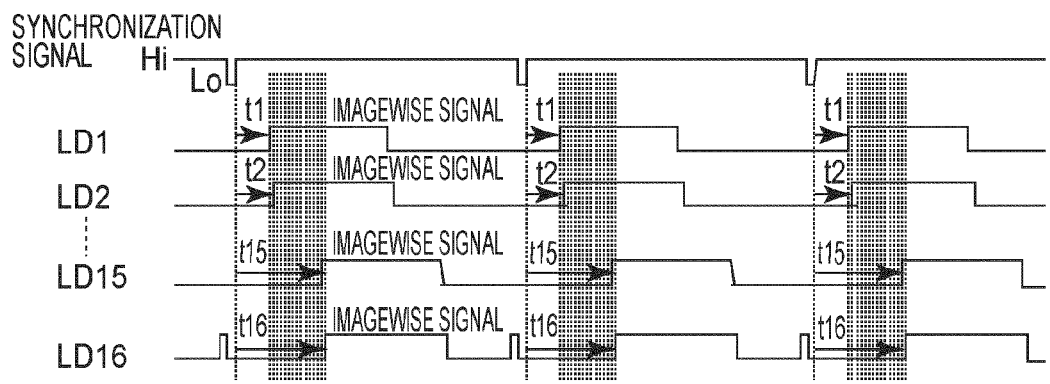
FIG. 4 is a timing chart for the writing start position determination in the first embodiment of the present invention.

FIG. 4 is a timing chart which shows the relationship between the synchronism signal and the timing of the scan staring position.

In this embodiment, the light beam from the light emitting member (16) which is not eclipsed (light beam width is not reduced) by the deflecting surface 6a of the rotary polygonal mirror (polygon mirror) 6 is incident on the synchronism detecting sensor 10, and the writing start timing signal (writing start position) is determined based on it.

In FIG. 4, the "synchronism signal" is a signal which is produced when the light beam is incident on the synchronism detecting sensor 10.

In FIG. 4, after elapse of time t1 (seconds) after the light beam emitted from the light emitting member (16) goes across the synchronism detecting slit 9 in the main-scan direction and the synchronism signal is turned to State Lo, the imagewise signal corresponding to the light beam emitted from the light emitting member (1) is turned "ON" and the image writing is started.

Similarly, the imagewise signal corresponding to the light beam emitted from the light emitting member (2) is turned "ON" after elapse of time t2 (seconds), and the image writing is initiated.

The same applies to the remaining beams, and the image writing start timing signals for all the light beams are determined based only on the synchronism signal of light beam emitted from the light emitting member (16).

Next, the method of determining the times t1-t16 will be explained below.

In the present embodiment, times t1-t16 until the imagewise signals of the light beams are turned on are measured prior to the factory shipment, and determined beforehand.

More specifically, the writing start timing signal for those light beams which are not used for the detection of the writing start timing signal, is predetermined on the basis of the writing start timing signal for the light beam with which the writing start timing signal is detected.

Figure 5:
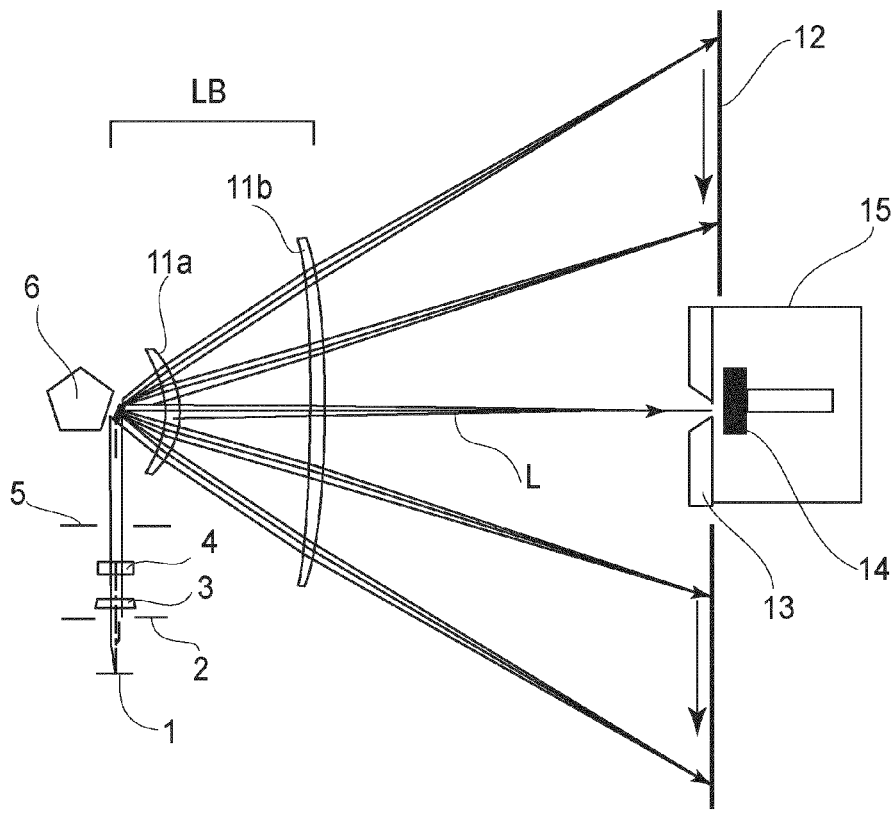
FIG. 5 is a schematic diagram which shows a writing start position measuring method in the first embodiment of the present invention.

FIG. 5 is a schematic diagram of a measuring optical system in the main-scan direction, for measuring the timing of the scan staring position in the present embodiment.

In FIG. 5, like numerals are assigned to components corresponding to those of FIG. 1.

A detection optical system 15 which comprises a slit 13 having knife edges and a photodetector (PD) 14 is disposed at the optical axis L of the imaging optical system LB, which is at a position corresponding to the scanned surface.

Then, the time differences t1 to t15 of the light beams emitted from the light emitting members (1) to (15), respectively, and passing through the detection optical system 15, with respect to the synchronism signal of the light beam emitted from the light emitting member (16), are measured.

Then, the values of t1-t16 are stored into a memory, not shown, to ensure that the writing start positions of all the light beams coincide with each other.

Since the photodetector 14 is aligned with the optical axis L of the imaging optical system LB, the influence of the chromatic aberration of magnification of the imaging optical system LB can be shared by the image writing starting side and the image writing ending side, such that the print position deviation due to the wavelength difference can be reduced.

The time from the detection of the synchronism signal at the light emitting member (16) to the start of writing by each light beam is denoted by t1-t16.

Due to various part production errors such as a positional error of the light emitting members, wavelength difference of the light source, surface precision of the deflecting surface, etc., or to assembling errors when the parts are mounted on the optical device, the times t1-t16 will be deviated from the theoretical values which are calculated based on the scan speed and the beam intervals.

In this embodiment, the delay times t1-t16 from the synchronism signal detected by use of the light beam of the light emitting member (16) to the writing start trigger are measured beforehand, prior to the factory shipments. Hence, the influence of the above-described errors can be reduced effectively, and high-precision printing position accuracy is secured.

In this embodiment, as described above, the writing start timing signal is determined by detecting the light beam from one light emitting member (light emitting member (16) in this embodiment) among the sixteen light emitting members (1)-(16), except the light emitting member (1) which emits a light beam that provides a least light quantity as the same is incident on the synchronism detecting sensor 10.

In other words, the writing start timing signal is determined by detecting the light beam from the light emitting member (16) which, among the light beams from the sixteen light emitting members (1)-(16), scans the scan surface 12 the latest.

In the present embodiment, the image height for detecting the writing start timing of the synchronism detecting optical system LC when converted upon the scanned surface 12 is denoted by $Y_{BD}$, and the maximum distance of the light emitting members of a number N in the main-scan direction is denoted by W.

Furthermore, the focal length of the input optical system LA in the main-scan section is denoted by $f_{col}$, and the focal length of the imaging optical system LB in the main-scan section is denoted by $f_{f\theta}$, and the effective image width on the scanned surface 12 is denoted by $Y_W$.

Here, the following condition is satisfied.

$$|Y_{BD}| \geq W \times f_{f\theta}/f_{col} + |Y_W/2| \tag{1}$$

The conditional expression (1) is a condition for assuring registration of the image writing start positions.

If the conditional expression (1) is unsatisfied, the light beam emitted from the light emitting member (1) arrives at the image writing start position before the light beam emitted from the light emitting member (16) is incident on the synchronism detecting sensor 10, such that the writing start position cannot be registered any more.

Here, if the angle of the light beam directed to the center of the synchronism detecting slit 9, from the optical axis, is denoted by $\theta_{BD}$, the image height $Y_{BD}$ can be expressed by $$Y_{BD} = f_{f\theta} \times \theta_{BD}$$

Next, a numerical example of parameters of the above conditional expression (1) in this embodiment will be described.

$\theta_{BD}$=54 deg.
$f_{f\theta}$=200 mm
W=0.87 mm
$f_{col}$=25 mm
$Y_W$=335 mm From this, the image height $|Y_{BD}|$ at the left-hand side of the conditional expression (1) as well as the value of $W \times f_{f\theta}/f_{col} + |Y_W/2|$ at the right-hand side thereof are:

Left hand side=200×54×π/180=188.5

Right hand side=0.87×200/25+335/2=174.46

This satisfies the above conditional expression (1).

More preferably, the above conditional expression (1) had better be set as follows.

$$|Y_{BD}| \geq W \times f_{f\theta}/f_{col} + |Y_W/2| + |Y_W/10| \tag{1a}$$

It should be noted that, although the synchronism detecting lens 8 may provide separately as in the present embodiment, a portion of the imaging optical system LB may be used for that.

Where a portion of the imaging optical system LB is used, generally, the synchronism detecting slit 9 may be disposed at a position corresponding to the photosensitive drum surface.

Furthermore, although the present embodiment uses a VCSEL light source by which multiple beams can be provided easily, similar advantageous results are obtainable if other types of semiconductor lasers are used.

In the present embodiment as described above, in an optical scanning device using light source means 1 having sixteen light emitting members such as described above, the writing start timing signal is determined based on the light beam emitted from one light emitting member.

Furthermore, the components of the input optical system LA are so configured that the quantity of the light beam incident on the synchronism detecting sensor 10 is kept at a level higher than a predetermined one.

With this arrangement, the present embodiment accomplishes an optical scanning device by which, even if wide field-angle scan is performed by use of a small-diameter rotary polygonal mirror, deviation of the printing position in the main-scan direction is avoided and thus a high-definition image is obtainable.

Furthermore, when the device is incorporated into a color image forming apparatus, the present embodiment provides a color image forming apparatus by which a high-definition color image is obtainable without a color drift.

It should be noted here that, although in the present embodiment the imaging optical system LB is comprised of two pieces of lenses, the invention is not limited to this. It may be comprised of a single piece of lens or lenses of more than three pieces.

Furthermore, the imaging optical system may be constituted by using a diffractive optical element therein.

Furthermore, although in the present embodiment the synchronism detection is carried out by using the light beam from the light emitting member (16), the invention is not limited to this. The writing start timing signal may be determined by detecting the light beam from any light emitting member other that the light emitting member which emits a light beam that provides a least light quantity as the same is incident on the synchronism detecting sensor 10.

Embodiment 2

Figure 6:
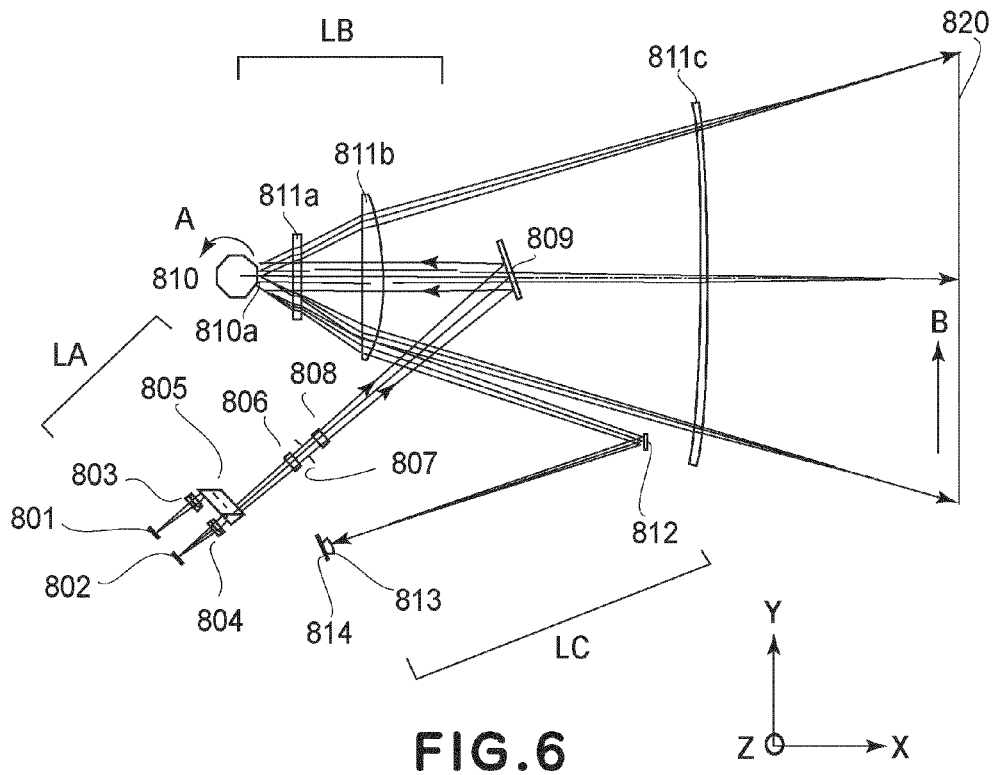
FIG. 6 is a main-scan sectional view of a second embodiment of the present invention.

FIG. 6 is a sectional view (main-scan sectional view) in the main-scan direction of a main portion of a second embodiment of the present invention.

In FIG. 6, like numerals are assigned to components corresponding to those of FIG. 1.

The present embodiment differs from the abovementioned first embodiment in the following points.

(1) The structure of the light source means;
(2) The printing direction of the image; and
(3) The structure of the input optical system (first optical means).

Other structures and optical functions are similar to the first embodiment and, based on this, similar advantageous effects are obtainable.

The present embodiment uses light source means of a number M (M is an integer not less than 2) each having a plurality of light emitting members of a number N (N is an integer not less than 2) which are disposed along a straight direction and are disposed with a tilt with respect to the sub-scan direction and the main-scan direction, respectively. Particularly, in this embodiment, there are two light source means 801 and 802 (M=2) each having eight light emitting members (N=8).

The light source means 801 and 802 comprise a VCSEL (plane emission laser) which is comprised of a monolithic multi-semiconductor laser.

In FIG. 6, denoted at 803 and 804 are collimator lenses which function to convert divergent light from the light source means 801 or 802 into a parallel light beam, a divergent light beam or, alternatively, a convergent light beam.

Denoted at 805 is a beam combining prism which functions to combine the light beams emitted from the light source means 801 and the light source means 802, respectively, so that the light rays are directed to an optical deflector 810 along the same light path.

Denoted at 806 is a spherical lens which serves to expand the light beam width in the main-scan direction, while ensuring the adjustability of the focus position on the scanned surface 820.

Denoted at 807 is a stop which serves to regulate the light beam width in the sub-scan direction.

Denoted at 808 is a cylindrical lens having a power in the sub-scan direction, such that, with respect to the sub-scan direction it functions to produce a focal line (line image) on the deflecting surface 810*a*.

Denoted at 809 is a reflecting mirror which deflects the light beam passed through the cylindrical lens 808 and directs the same to the optical deflector 810, so as to make the optical scanning device compact.

The light source means 801 and 802, collimator lenses 803 and 804, spherical lens 806, cylindrical lens 808, and first and second imaging lenses 811*a* and 811*b* to be described below, are components of an input optical system LA (first optical means).

Denoted at 810 is a rotary polygonal mirror (polygon mirror) as the optical deflector, which rotates at a constant speed in the direction of an arrow A.

The light beam directed toward the optical deflector 810 is incident on the rotary polygonal mirror, as a light beam being sufficiently wider than the deflecting surface (facet) of the rotary polygonal mirror. Thus, the system is what is called an over-field type scanning system (OFS). This is to achieve higher speed and larger density.

Denoted at LB is an imaging optical system which comprises first and second imaging lenses (f-θ lens) 811*a* and 811*b*.

The first and second imaging lenses 811*a* and 811*b* are comprised of a spherical surface and a cylindrical surface, made of a glass material.

The imaging optical system LB forms a latent image on the photosensitive drum surface 820 as the scanned surface, based on the light beam scanningly deflected by the optical deflector 810. Additionally, it functions to compensate the surface tilt of the deflecting surface of the optical deflector.

Furthermore, the first and second imaging lenses 811*a* and 811*b* are also components of the input optical system LA.

In the present embodiment, the light beam (incident light flux) to be incident on the optical deflector 810 passes through the first and second imaging lenses 811*a* and 811*b*, and the light beam deflectively reflected by the optical deflector 810 is again incident on the first and second imaging lenses 811*a* and 811*b* (i.e., double-path structure).

Furthermore, the light beam to be incident on the deflecting surface 810*a* in the sub-scan section is incident in an oblique direction with a predetermined angle relative to a normal to the deflecting surface 810a, by which the input light beam and the deflected light beam are separated (oblique incidence optical system).

Denoted at 811c is a long lens made of plastic, having a power mainly in the sub-scan direction. It has a surface having a curvature in the sub-scan direction which changes continuously in accordance with the height (Y) in the main-scan direction. This is to secure the uniformity of the imaging magnification in the sub-scan direction as well as the field curvature in the sub-scan direction.

Denoted at 812 is a synchronism detecting mirror which reflects the synchronism detecting light beam toward the synchronism signal detecting means 814 side to be described below. This synchronism detecting mirror 812 serves to turn back the light beam directed to the synchronism signal detecting means 814, and it is provided to reduce the overall size of the system.

Denoted at 813 is a synchronism detecting slit which is disposed at an imaging position of the imaging optical system LB. This synchronism detecting slit 813 has an end portion formed with a knife edge shape, and it determines the position where the spot being imaged by the imaging optical system LB and scanned in the main-scan direction is incident on the synchronism signal detecting means 814.

Denoted at 814 is a synchronism detecting sensor as the synchronism signal detecting means, which detects a portion of the light beam scanningly deflected by the optical deflector 810 to produce writing start timing signals for the light beams of a number N (8) on the scanned surface 820.

The synchronism detecting mirror 812 and the synchronism detecting slit 813 are components of the synchronism detecting optical system LC as the second optical means.

Figure 7:
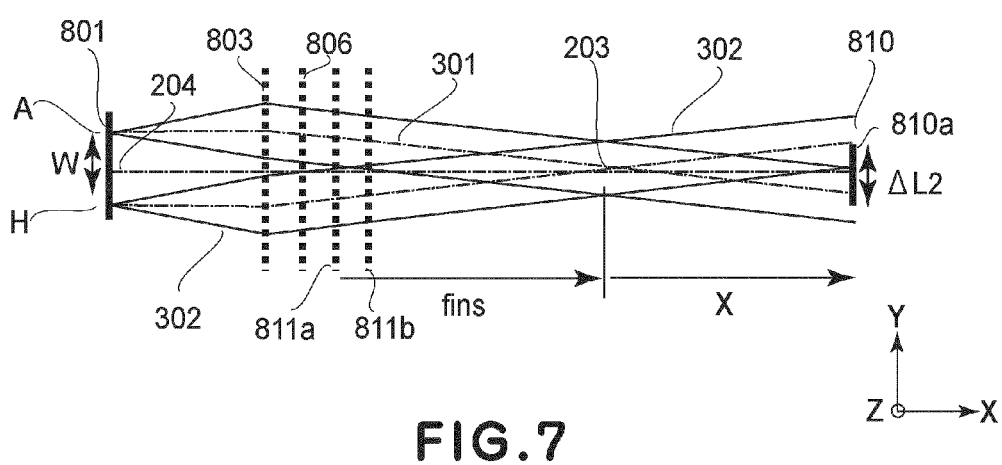
FIG. 7 is a schematic diagram of an input optical system of the second embodiment of the present invention.

FIG. 7 is a sectional view (sub-scan sectional view), in the sub-scan direction, of a main portion of an input optical system of the second embodiment of the present invention.

In FIG. 7, like numerals are assigned to components corresponding to those of FIG. 1.

In the present embodiment, each of the light source means 801 and the light source means 802 is comprised of eight light emitting members (A)-(H) which are disposed with a tilt with respect to the sub-scan direction and the main-scan direction, respectively. Also, the light emitting members (A)-(H) are disposed away from the main-scan direction by a distance W.

Only the light emitting members of the light source means 801 are illustrated in FIG. 7 for convenience. Actually, however, the light source means 802 has a similar structure as of the light source means 801.

Furthermore, although the light emitting members have been described only with respect to the light emitting members (A) and (H), the remaining light emitting members (B) to (G) are present between the light emitting member (A) and the light emitting member (H).

The eight light beams from the light source means 801 go through the collimator lens 803, spherical lens 806, and first and second imaging lenses 811a and 811b, by which the light beam in the main-scan direction is converted into a parallel light beam, and then it is incident on the optical deflector 810.

Figure 8:
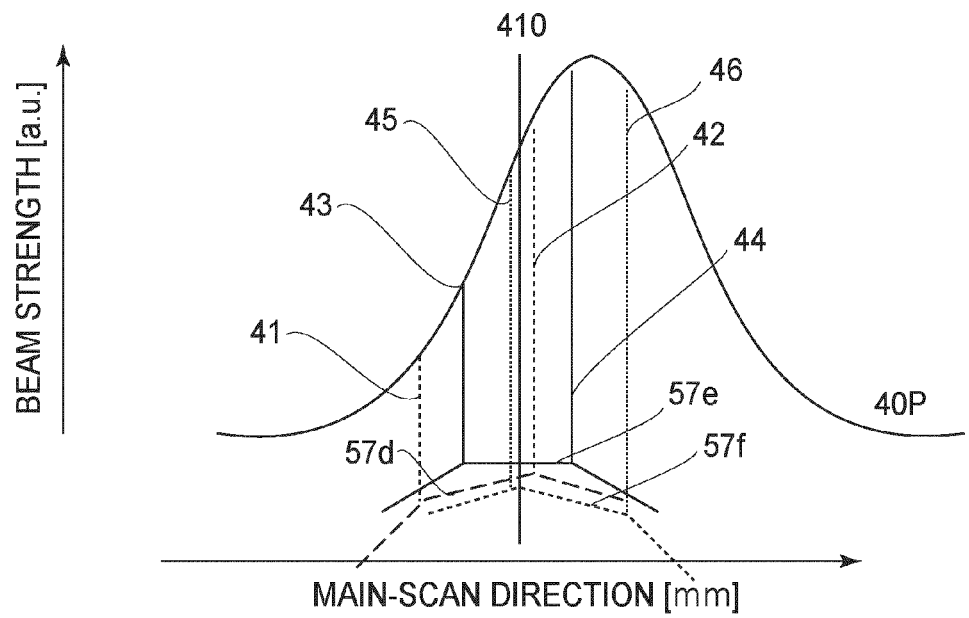
FIG. 8 is a diagram for explaining the coupling in the second embodiment of the present invention.

The beam intensity of the eight light beams emitted from the light emitting members (A)-(H) provides a distribution of Gaussian shape such as shown in FIG. 8.

The intensity center 301 of the light beam intersects with the incidence optical axis 204 at a rear focal position of the collimator lens 803, spherical lens 806 and first and second imaging lenses 811a and 811b.

Then, upon the deflecting surface 810a, the peak intensity of the light beam emitted from the light emitting member (A) and the peak intensity of the light beam emitted from the light emitting member (H) are spaced from each other by a distance ΔL2.

The distance ΔL2 on the deflecting surface 810a of the present embodiment may use the parameters described hereinbefore and, additionally, the distance from the first imaging lens 811a to the rear focal point position is denoted by $f_{ins}$, and the distance from the rear focal point position to the deflecting surface 810a is denoted by X. Then, a relation $$\Delta L2 = X \cdot W/f_{ins} = 4.39 \text{ mm}$$

is given. Thus, the light quantity of the light beam of the light emitting member (A) advancing toward the scanned surface 820 changes, as shown in FIG. 8, from the position 57d to the position 57f with the movement of the deflecting surface 810a. Upon the scan surface 820, it changes such as illustrated in FIG. 9.

Figure 9:
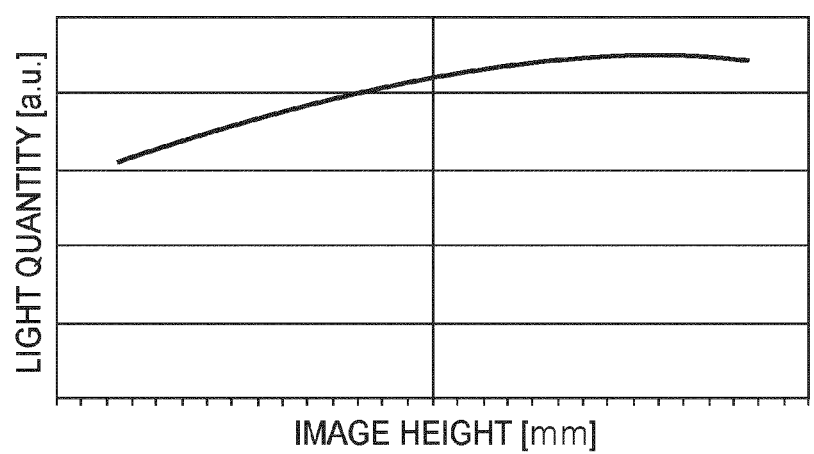
FIG. 9 is a diagram which shows the light quantity at the image height of the second embodiment of the present invention.

Since the light emitting member (H) is disposed at the opposite side of the light emitting member (A) with respect to the optical axis 204, the change of the light quantity on the scanned surface 820 is inverted to that of the light emitting member (A) shown in FIG. 9. Hence, light quantity rises at the image height on negative side.

Figure 10:
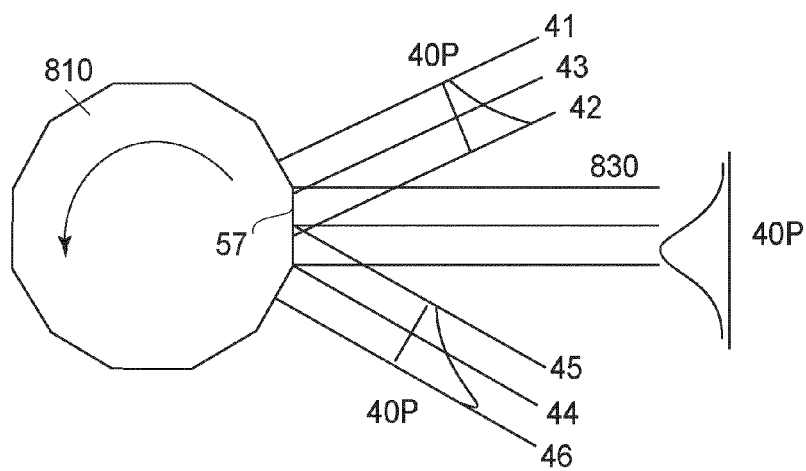
FIG. 10 is an enlarged view of the input optical system of the second embodiment of the present invention.

FIG. 10 is the schematic diagram which illustrates changes in the light quantity of the light beam, across the deflecting surface, in the present embodiment. In FIG. 10, like numerals are assigned to components corresponding to those of FIG. 8.

In FIG. 10, the incident light flux 830 has an intensity distribution of Gaussian shape as depicted by beam intensity 40P. The intensity peak position thereof passes the position spaced from the optical axis 204 by a distance (ΔL2/2), for the reason described above.

Due to the movement of the deflecting surface 57, the beam intensity 40P of the scanningly deflected light beam is different between the scan starting side 45-46 and the scan ending side 41-42.

In the present embodiment, as compared with the light emitting member (H), the light quantity of the light beam at the scan starting side of the light emitting member (A) is low. Hence, the synchronism signal is detected on the basis of the light beam emitted from the light emitting member (H).

With regard to the light emitting members (A)-(G), the image writing start position is determined in accordance with times (t1-t7) as calculated from the design beam intervals.

If the FFP (full-angle half-maximum) of the light source means 801 of the present embodiment is equal to 10 deg., it is seen from ΔL2=4.39 mm that the light quantity of the light beam to be emitted from the light emitting member (H) at the image height is higher by 24% as compared with the light beam to be emitted from the light emitting member (A).

With this arrangement, more stable synchronism detection is accomplished as compared with a case where the detection is made based on the light beam emitted from the light emitting member (A).

It should be noted that, in the present embodiment, the light quantity had better be set in a range from 40% to 99% of the maximum light quantity.

More preferably, it may be in a range from 60% to 99% and, yet more desirably, it may be from 70% to 99%.

With regard to the light source means 802, similarly, the synchronism detection is carried out by use of the light beam from the light emitting member (H) whose light quantity rises in the negative image height side where the synchronism detection is to be done, and the image writing start positions of the light emitting members (A)-(G) are determined in accordance with times (t1-t7) as calculated from the design beam intervals.

In the present embodiment, the synchronism detection of the light source means 801 and the light source means 802 is carried out by using the same synchronism detecting sensor 814.

In this embodiment, as described above, the writing start timing signal is determined by detecting the light beam from one light emitting member (light emitting member (H) in this embodiment) among the eight light emitting members (A)-(H), other than the light emitting member (A), emitting a light beam which provides a least light quantity as the same is incident on the synchronism detecting sensor 814.

In other words, the writing start timing signal is determined by detecting the light beam from the light emitting member (H) which, among the light beams from the eight light emitting members (A)-(H), scans the scan surface 820 the latest.

Design values of the optical scanning device according to the present embodiment, will be shown in Table 2 below.

Next, a numerical example of the parameters of the conditional expression (1) in the present embodiment will be described.

$\theta_{BD}$=28 deg.
$f_{f\theta}$=345 mm
W=0.8 mm
$f_{col}$=110.2 mm
$Y_W$=310 mm From this, the image height $|Y_{BD}|$ at the left-hand side of the conditional expression (1) as well as the value of $W \times f_{f\theta}/f_{col}+|Y_W/2|$ at the right-hand side thereof are:

Left hand side=345×28×π/180=168.6

Right hand side=1×345/110.2+310/2=158.1

This satisfies the above conditional expression (1).

In the present embodiment as described above, in an optical scanning device having light emitting members of a num-

TABLE 2

| Used wavelength (mm) | 6.55E−07 |
|---|---|
| No. of polygon surfaces | 12 |
| Polygon circumscribing radius (mm) | 14.5 |
| Polygon rotational angle (plus/minus deg.) | 12.58 |
| Main-scan direction incidence angle (deg.) | 0 |
| Sub-scan direction incidence angle (deg.) | 0.8 |
| Deflection point - GIR1 (mm) | 2.50E+01 |
| f-θ lens focal length (mm) | 3.45E+02 |

| Polygon rotational center coordinates when the deflection point on the axial principal ray is taken as zero | |
|---|---|
| X | −14.0 |
| Y | 0 |

| | | R1 surface | | R2 surface | |
|---|---|---|---|---|---|
| | | Scan starting side (s) | Scan ending side (e) | Scan starting side (s) | Scan ending side (e) |
| | d | 4.00E+00 | | d | 4.150E+01 |
| | n | 1.78E+00 | | n | 1.000E+00 |
| Main scan | R | −3.56E+02 | | R | −3.56E+02 |
| Sub scan | r | −3.56E+02 | | r | −3.56E+02 |

| | | R3 surface | | R4 surface | |
|---|---|---|---|---|---|
| | | Scan starting side (s) | Scan ending side (e) | Scan starting side (s) | Scan ending side (e) |
| | d | 1.50E+01 | | d | 2.994E+02 |
| | n | 1.70E+00 | | n | 1.000E+00 |
| Main scan | R | infinite | | R | infinite |
| Sub scan | r | infinite | | r | infinite |

| Type | | R5 surface | | R6 surface | | | |
|---|---|---|---|---|---|---|---|
| ST2 | | Scan starting side (s) | Scan ending side (e) | Scan starting side (s) | Scan ending side (e) | | |
| Main scan | d | 4.00E+00 | | d | 1.68E+02 | | |
| | n | 1.53E+00 | | n | 1.000E+00 | | |
| | R | −1.00E+03 | | R | −1.00E+03 | | |
| | K | 0.00E+00 | K | 0.00E+00 | K | 0.00E+00 | K | 0.00E+00 |
| | B4 | 0.00E+00 | B4 | 0.00E+00 | B4 | 0.00E+00 | B4 | 0.00E+00 |
| | B6 | 0.00E+00 | B6 | 0.00E+00 | B6 | 0.00E+00 | B6 | 0.00E+00 |
| | B8 | 0.00E+00 | B8 | 0.00E+00 | B8 | 0.00E+00 | B8 | 0.00E+00 |
| | B10 | 0.00E+00 | B10 | 0.00E+00 | B10 | 0.00E+00 | B10 | 0.00E+00 |
| Sub scan | r | 1.14E+02 | r | | r | −1.10E+02 | r | |
| | D2 | 6.63E−06 | D2 | 6.63E−06 | D2 | 8.05E+00 | D2 | 8.05E+00 |
| | D4 | 0.00E+00 | D4 | 0.00E+00 | D4 | 0.00E+00 | D4 | 0.00E+00 |
| | D6 | 0.00E+00 | D6 | 0.00E+00 | D6 | 0.00E+00 | D6 | 0.00E+00 |
| | D8 | 0.00E+00 | D8 | 0.00E+00 | D8 | 0.00E+00 | D8 | 0.00E+00 |
| | D10 | 0.00E+00 | D10 | 0.00E+00 | D10 | 0.00E+00 | D10 | 0.00E+00 | ber 8×2, the writing start timing signal is determined based on two light beams and the synchronism detection is made based on the light beam having a largest light quantity among the light beams incident on the synchronism detecting sensor.

With this arrangement, the present embodiment accomplishes an optical scanning device having light emitting members of a number N×M, by which deviation of the printing position in the main-scan direction is avoided and thus a high-definition image is obtainable.

Furthermore, when the device is incorporated into a color image forming apparatus, the present embodiment provides a color image forming apparatus by which a high-definition color image is obtainable without a color drift.

Embodiment 3

Figure 11:
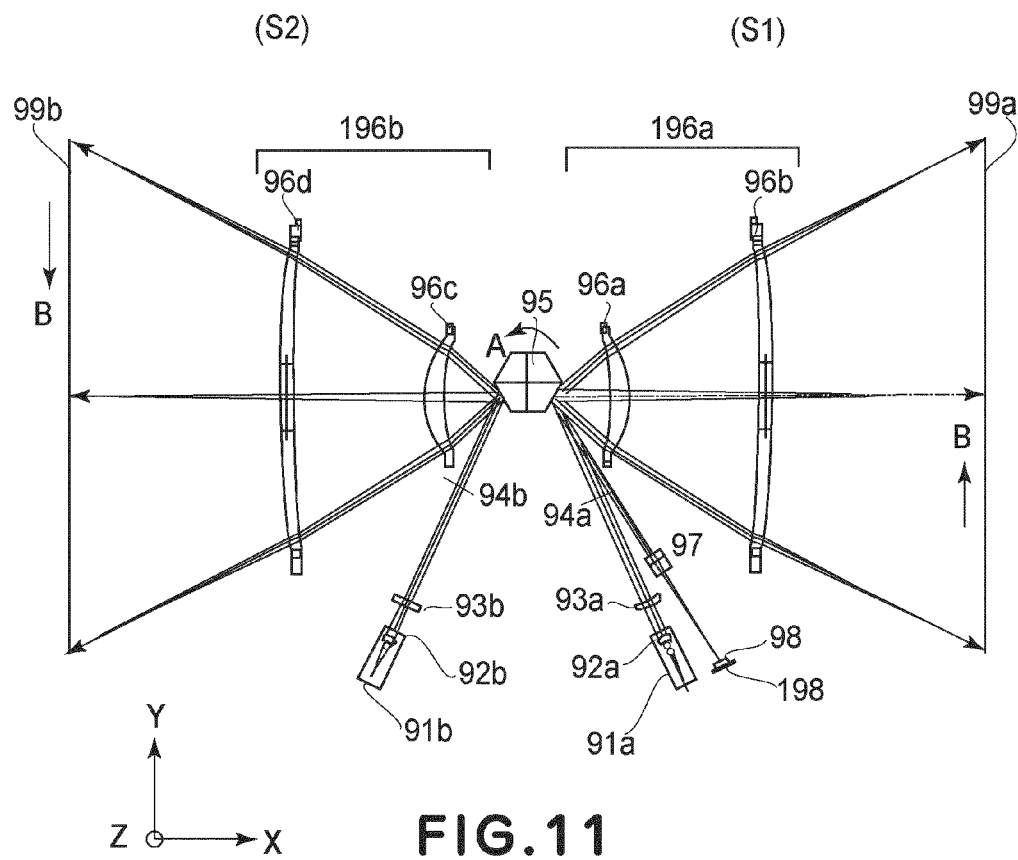
FIG. 11 is a main-scan sectional view of a third embodiment of the present invention.
Figure 12:
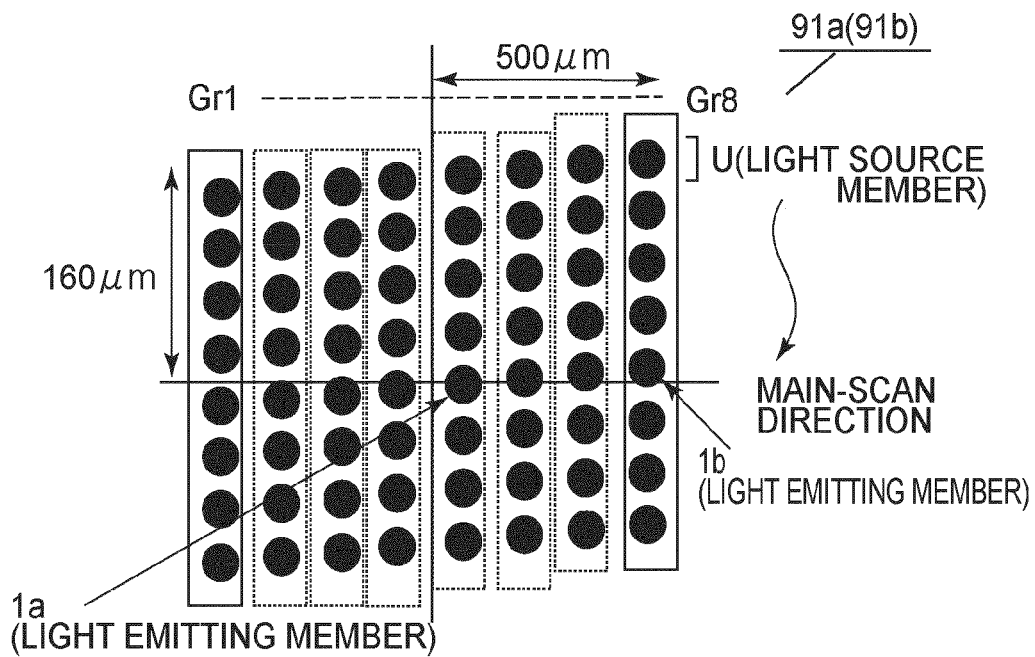
FIG. 12 is an enlarged view of the light source means in the third embodiment of the present invention.

FIG. 11 is a sectional view (main-scan sectional view), in the main-scan direction, of a main portion of a first embodiment of the present invention. FIG. 12 is an enlargement schematic diagram of the light source means shown in FIG. 11.

In FIG. 11 and FIG. 12, like numerals are assigned to components corresponding to those of FIG. 1.

The present embodiment differs from the abovementioned first embodiment in the following points.

(1) The structure of the light source means;
(2) The number of the surfaces of the rotary polygonal mirror and the circumscribed circle diameter thereof; and
(3) The printing direction of the image.

Other structures and optical functions are similar to the first embodiment and, based on this, similar advantageous effects are obtainable.

Design values of the optical scanning device according to the present embodiment are shown in Table 3 below.

TABLE 3

| | |
|---|---|
| Used wavelength (mm) | 7.90E−07 |
| f-θ lens refractive index | 1.524085 |
| No. of polygon surfaces | 6 |
| Polygon circumscribing radius (mm) | 20 |
| Polygon rotational angle (plus/minus deg.) | 20.54 |
| Main-scan direction incidence angle (deg.) | 65 |
| Sub-scan direction incidence angle (deg.) | 2.2 |
| Deflection point - GIR1 (mm) | 3.60E+01 |
| f-θ lens focal length (mm) | 2.13E+02 |

Polygon rotational center coordinates when the deflection point on the axial principal ray is taken as zero

| | |
|---|---|
| X | −15.36 |
| Y | 8.12 |

| Type | R1 surface | | | | R2 surface | | | |
|---|---|---|---|---|---|---|---|---|
| ST2 | Scan starting side (s) | | Scan ending side (e) | | Scan starting side (s) | | Scan ending side (e) | |
| Main scan | d | | 9.60E+00 | | d | | 6.800E+01 | |
| | R | −8.53E+01 | | | R | −4.80E+01 | | |
| | K | −4.99E+00 | K | −4.99E+00 | K | −1.25E+00 | K | −1.25E+00 |
| | B4 | 4.33E−07 | B4 | 4.33E−07 | B4 | −9.39E−09 | B4 | −9.39E−09 |
| | B6 | −1.29E−10 | B6 | −1.29E−10 | B6 | 1.62E−10 | B6 | 1.62E−10 |
| | B8 | −6.19E−14 | B8 | −6.19E−14 | B8 | −1.64E−13 | B8 | −1.64E−13 |
| | B10 | 3.76E−17 | B10 | 3.76E−17 | B10 | 4.13E−17 | B10 | 4.13E−17 |
| Sub scan | r | −1.00E+03 | r | | r | −1.00E+03 | r | |
| | D2 | 0.00E+00 | D2 | 0.00E+00 | D2 | 0.00E+00 | D2 | 0.00E+00 |
| | D4 | 0.00E+00 | D4 | 0.00E+00 | D4 | 0.00E+00 | D4 | 0.00E+00 |
| | D6 | 0.00E+00 | D6 | 0.00E+00 | D6 | 0.00E+00 | D6 | 0.00E+00 |
| | D8 | 0.00E+00 | D8 | 0.00E+00 | D8 | 0.00E+00 | D8 | 0.00E+00 |
| | D10 | 0.00E+00 | D10 | 0.00E+00 | D10 | 0.00E+00 | D10 | 0.00E+00 |

| Type | R3 surface | | | | R4 surface | | | |
|---|---|---|---|---|---|---|---|---|
| ST2 | Scan starting side (s) | | Scan ending side (e) | | Scan starting side (s) | | Scan ending side (e) | |
| Main scan | d | | 5.50E+00 | | d | | 1.28E+02 | |
| | R | −9.36E+02 | | | R | 2.04E+03 | | |
| | K | 0.00E+00 | K | 0.00E+00 | K | −1.33E+03 | K | −1.33E+03 |
| | B4 | 0.00E+00 | B4 | 0.00E+00 | B4 | −1.92E−07 | B4 | −1.92E−07 |
| | B6 | 0.00E+00 | B6 | 0.00E+00 | B6 | 1.47E−11 | B6 | 1.47E−11 |
| | B8 | 0.00E+00 | B8 | 0.00E+00 | B8 | −9.05E−16 | B8 | −9.05E−16 |
| | B10 | 0.00E+00 | B10 | 0.00E+00 | B10 | 2.47E−20 | B10 | 2.47E−20 |
| Sub scan | r | 1.30E+02 | r | | r | −4.47E+01 | r | |
| | D2 | 0.00E+00 | D2 | 0.00E+00 | D2 | 5.88E−05 | D2 | 5.88E−05 |
| | D4 | 0.00E+00 | D4 | 0.00E+00 | D4 | −5.77E−09 | D4 | −5.77E−09 |
| | D6 | 0.00E+00 | D6 | 0.00E+00 | D6 | 6.82E−13 | D6 | 6.82E−13 |
| | D8 | 0.00E+00 | D8 | 0.00E+00 | D8 | −3.89E−17 | D8 | −3.89E−17 |
| | D10 | 0.00E+00 | D10 | 0.00E+00 | D10 | 9.19E−22 | D10 | 9.19E−22 |

The optical scanning device of the present embodiment includes two imaging optical systems 196a and 196b which are disposed to sandwich the optical deflector (rotary polygonal mirror) 95. A plurality of light beams of a number N (64 in this embodiment) are incident on each of these imaging optical systems 196a and 196b, and the light beams of a number N are deflectively reflected at the same time by means of one and the same optical deflector 95.

Then, the light beams of a number N are directed to associated photosensitive drum surfaces 99a and 99b, by which the photosensitive drum surfaces 99a and 99b are optically scanned (i.e., tandem type optical scanning device).

Denoted in the drawing at S1 and S2 are first and second scanning units (hereinafter, each will be referred to as "station" or "scanning optical system").

The components of the first and second scanning units S1 and S2 will be described mainly with reference to those of the first scanning unit S1. As regards the components of the second scanning unit S2, the components corresponding to those of the first scanning unit S1 will be mentioned in parenthesis.

The first (second) scan unit S1 (S2) has a collimator lens 92a (92b) which converts a divergent light beam from the light source means 91a (91b) into a parallel light beam, and a cylindrical lens 93a (93b) having a refracting power only in the sub-scan direction.

Furthermore, it comprises an aperture stop 94a (94b) which regulates the incident light flux, one optical deflector 95 as the deflecting means, and an imaging optical system 196a (196b) for focusing the light beam from the optical deflector 95 into a spot on the scanned surface 99a (99b).

The light source means 91a (91b) in the present embodiment comprises a VCSEL (surface emission laser) having a plurality of light source units U of a number S (S is an integer not less than 2) each comprising a plurality of light emitting members of a number N (N is an integer number not less than 2) which are disposed with a tilt with respect to the sub-scan direction and the main-scan direction.

As shown in FIG. 12, the light source means 91a (91b) of the present embodiment has light emitting members of a number eight in the main-scan direction and of a number eight in the sub-scan direction, that is, of a total number 64, which are disposed two-dimensionally with a tilt with respect to the sub-scan direction and the main-scan direction, respectively.

Furthermore, in the present embodiment, the optical axes of the collimator lens 92a (92b), aperture stop and cylindrical lens 93a (93b) are all disposed perpendicularly to the principal ray.

More specifically, these are disposed with a tilt of 2.2 deg. in the sub-scan section.

The imaging optical system 196a (196b) has both of a light collecting function and an f-θ characteristic, and it comprises first and second imaging lenses 96a and 96b (96c and 96d).

The first and second imaging lenses 96a and 96b (96c and 96d) function to provide focus correction (field curvature correction) in the sub-scan direction as well as correction of uniformity (changes of the spot diameter due to the image height) of the magnification in the sub-scan direction of the imaging lens.

To this end, the radius of curvature in the sub-scan direction of the surface (surface r4) at the scanned surface 99a (99b) side of the second imaging lens 96b (96d) (lens G2) which is closest to the scanned surface 99a (99b) side, is changed continuously.

Generally, the curvature radius of the sub-scan direction of at least two surfaces is changed to achieve correction of both of them. In this embodiment, however, since the uniformity of magnification is corrected based on the shape in the main-scan direction, the field curvature is corrected by changing one surface only.

The first and second imaging lenses 96a and 96b (96c and 96d) of the present embodiment are made from a plastic lens, and the shape in the main-scan direction is made symmetrical between the scan starting side and the scan ending, this being for convenience of molding.

Furthermore, with regard to the curvature radius in the sub-scan direction, the curvature at least one surface is changed continuously to correct the field curvature, wavefront aberration and a shift of the spot diameter.

Furthermore, in the present embodiment, the scan line curve and deterioration the wavefront aberration which might result from the incidence of the light beam on the deflecting surface in the sub-scan direction, are corrected by decentration (a shift of 2.74 mm in the Z-direction) of the G2 lens 96b (96d).

Denoted at 97 is a synchronism detecting lens which functions to image the synchronism detecting light beam for determining the timing of the scan staring position on the photosensitive drum surface 99a (99b), upon the synchronism detecting slit 98 surface within the main-scan section and the sub-scan section as well.

The synchronism detecting lens 97 of the present embodiment comprises an anamorphic lens having different refracting powers in the main-scan direction and the sub-scan direction, respectively.

Denoted at 198 is a synchronism detecting sensor as the synchronism signal detecting means, which detects a portion of the light beam scanningly deflected by the optical deflector 95 and produces writing start timing signals for the light beams of a number 64 on the scanned surface 99a (99b).

In the present embodiment, the first and second scanning units S1 and S2 use the same optical deflector 95 together, but more specifically, the first and second scanning units S1 and S2 use the light beams which are scanningly deflected by different deflecting surfaces of the optical deflector 95.

Furthermore, in the present embodiment, the writing start timing to the photosensitive drum surface 99a (99b), as the scanned surface, of the first (second) scanning unit S1 (S2) is detected based on the detection of the light beam from the deflecting surface of the optical deflector 95 through the synchronism detecting sensor 198.

Then, by using the signal from the synchronism detecting sensor 198, the writing start timing to the photosensitive drum surface 99a (99b) is determined.

In the present embodiment, first of all, in the first station S1 the light beams of a number 64 having been optically modulated by light source means 91a in accordance with the imagewise information, are converted by the collimator lens 92a into parallel light beams, and then they are incident on the cylindrical lens 93a.

Within the main-scan section, the light beam incident on the cylindrical lens 93a goes outwardly without being changed, and then it is regulated by the aperture stop 94a.

Furthermore, within the sub-scan section, the light beam is converged and it is regulated by the aperture stop 94a. Then, the light beam is incident on the deflecting surface 5a of optical deflector 95 from an oblique direction (oblique incidence) with an angle 2.2 deg., whereby it is imaged as a line image (linear image being elongated in the main-scan direction).

Then, the light beams of a number 64 reflectively deflected by the deflecting surface of the optical deflector 95 are imaged into a spot shape on the photosensitive drum surface 99a, by means of the imaging optical system 196a.

Then, by rotating the optical deflector 95 in the direction of an arrow A, the photosensitive drum surface 99a is optically scanned at a constant speed in the direction of an arrow B (main-scan direction).

In this manner, the image recording is carried out on the photosensitive drum surface 99a which is a recording medium.

Here, in order that the timing of the scan staring position on the photosensitive drum surface 99a is adjusted before starting the optical scan of the photosensitive drum surface 99a, a portion (synchronism detecting light beam) of the light beam reflectively deflected by the deflecting surface of the optical deflector 95 is collected on the synchronism detecting slit 98 surface by means of the synchronism detecting lens 97.

Afterwards, the light beam collected on the synchronism sensing slit 98 surface is directed to the synchronism detecting sensor 198.

Then, by using the writing start position detection signal (synchronism signal) obtained by detecting an output signal from the synchronism detecting sensor 198, the timing of the scan staring point of the image recording on the photosensitive drum surface 99a is adjusted.

In the second station S2, the light beams of a number 64 emitted from the light source means 91b are incident on the deflecting surface of the optical deflector 95 from the same direction as the incidence direction in the first scanning unit S1.

Then, the light beams of a number 64 reflectively deflected by the deflecting surface are imaged into a spot shape on the photosensitive drum surface 99b, by means of the imaging optical system 196b, whereby the optical scanning is carried out.

In this manner, scan lines are defined on the two photosensitive drum surfaces 99a and 99b, whereby the image recording is carried out.

Next, the synchronism detection in the present embodiment will be explained.

The synchronism detection in the present embodiment is performed by a group Gr1 which is comprised of eight light emitting members disposed along the sub-scan direction as shown in FIG. 12.

The group Gr1 has eight light emitting members which are disposed in a single array along the sub-scan direction and, therefore, the light beams from these eight light emitting members inside the group Gr1 move across the synchronism detecting slit 98 at the same time.

Here, all the light emitting members of the group Gr1 are simultaneously energized to emit light.

With this arrangement, a larger light quantity can be produced as compared with a case where the synchronism detection is carried out by using only one light emitting member.

Furthermore, as compared with a case where the detection is made based on the group Gr8, the quantity of eclipse of light beam upon the deflecting surface is small. Thus, the synchronism detection can be made more stably.

Figure 13:
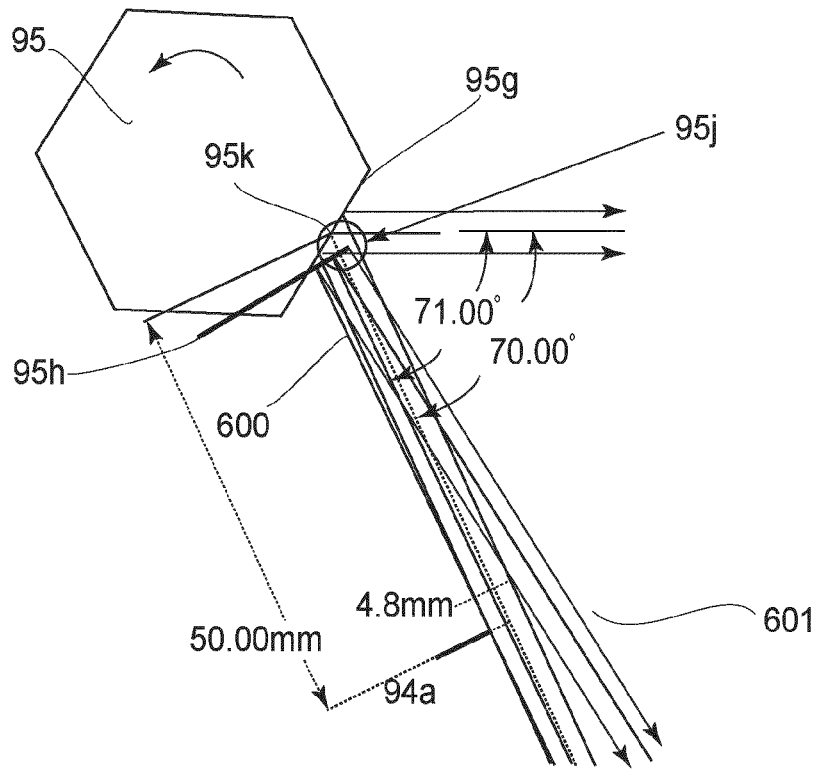
FIG. 13 is an enlarged view of a main portion of the third embodiment of the present invention.

FIG. 13 is a main-scan sectional view showing a portion around the optical deflector of the third embodiment of the present invention, in an enlarged scale. Specifically, it illustrates the relationship between the light beam directed toward the synchronism detecting optical system LC and the deflecting surface of the optical deflector.

In FIG. 13, like numerals are assigned to components corresponding to those of FIG. 11.

In FIG. 13, the second aperture stop 94a is disposed at a position of 50 mm from the axial deflection point 95K. The second aperture stop functions to regulate the light beam width in the main-scan direction to 4.8 mm, and it is so disposed to prevent plural light beams from spacing away from each other in the main-scan direction on the deflecting surface.

Illustrated in FIG. 13 at a reference numeral 95g is the state of deflection of the optical deflector 95 as it just deflects the light ray which passes along the optical axis of the imaging optical system LB. Also, illustrated at 95h is the state of the deflecting surface as it just deflects the light ray toward the synchronism detecting lens 97 and the synchronism detecting slit 98.

The light beam from the group Gr1 which advances toward the end portion 95J of the deflecting surface 95h has an angle of only 1.15 deg. in the main-scan direction, relative to the optical axis of the collimator lens 92a.

Therefore, as compared with a case where the synchronism detection is made by the group Gr8, the quantity of eclipse of the light ray is lowered and, thus, the synchronism detection can be performed with a highest light quantity. Hence, stable synchronism detection is assured.

Figure 14:
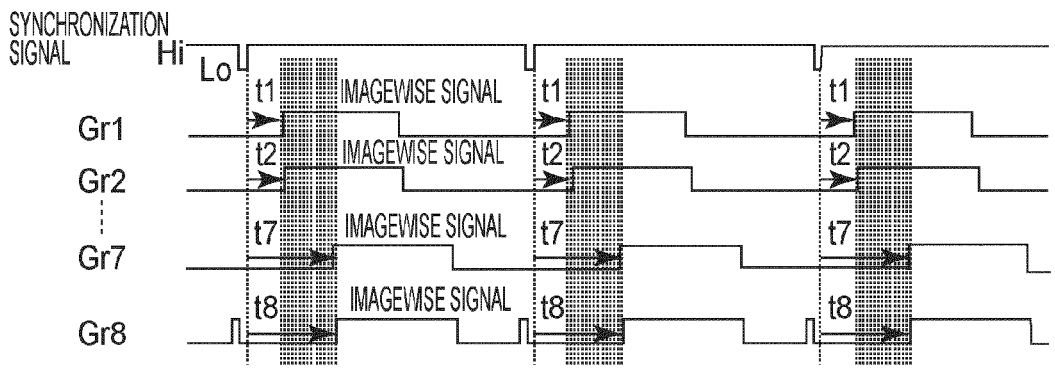
FIG. 14 is a timing chart for the writing start position determination in the third embodiment of the present invention.

FIG. 14 is a timing chart of the present embodiment. Specifically, FIG. 14 illustrates the relationship between the synchronism signal and the timing of the scan staring position.

The synchronism timing of the present embodiment is measured prior to the factory shipments, like the first embodiment.

Due to various part production errors such as a positional error of the light emitting members, wavelength difference of the light source, surface precision of the deflecting surface, etc., or to assembling errors when the parts are mounted on the optical device, the theoretical times t1-t16 calculated based on the scan speed and the beam intervals will be deviated.

These errors can be canceled by measuring the values of times t2-t8 prior to the shipment, beforehand as in the present embodiment, and thus higher-precision printing position accuracy is accomplished.

In the present embodiment, the writing start timing signal is determined by detecting the light beam from one group (group Gr1 in this embodiment) among the eight groups Gr1-Gr8, other than the group (Gr8) which emits a light beam that provides a least light quantity as the same is incident on the synchronism detecting sensor.

In other words, the writing start timing signal is determined by detecting the light beam from one (Gr1) of the eight groups (Gr1) to (Gr8) which, among the light beams of these groups Gr1-Gr8, scans the scan surface 198 the latest.

Next, a numerical example of parameters of the above conditional expression (1) in this embodiment will be described.

$\theta_{BD}$=57 deg.
$f_{f\theta}$=213 mm
W=1 mm
$f_{col}$=25 mm
$Y_W$=310 mm

From this, the image height $|Y_{BD}|$ at the left-hand side of the conditional expression (1) as well as the value of $W \times f_{f\theta}/f_{col}+|Y_W/2|$ at the right-hand side thereof are:

Left hand side=213×57×π/180=211.9

Right hand side=1×213/25+310/2=155.84

This satisfies the above conditional expression (1).

If the conditional expression (1) is unsatisfied, the light beam emitted from the group Gr8 arrives at the image writing start position before the light beam emitted from the group Gr1 is incident on the synchronism detecting sensor 198, such that the writing start position cannot be registered any more.

In the present embodiment as described above, in an optical scanning device using light source means having sixty-four light emitting members disposed two-dimensionally as described above, the writing start timing signal is determined based on one group which is comprised of eight light emitting members disposed along the sub-scan direction.

Furthermore, the components of the input optical system LA are so configured that the quantity of the light beam incident on the synchronism detecting sensor 198 is kept at a level higher than a predetermined one.

With this arrangement, the present embodiment accomplishes an optical scanning device by which, even if wide field-angle scan is performed by use of a small-diameter rotary polygonal mirror, deviation of the printing position in the main-scan direction is avoided and thus a high-definition image is obtainable.

Furthermore, when the device is incorporated into a color image forming apparatus, the present embodiment provides a color image forming apparatus by which a high-definition color image is obtainable without a color drift.

It should be noted here that the light source means of the present embodiment is not limited to the one disclosed here. It may be one described with reference to the first or second embodiment.

To the contrary, the light source means of the present embodiment may be incorporated into the first or second embodiment.

Embodiment 4

Figure 15:
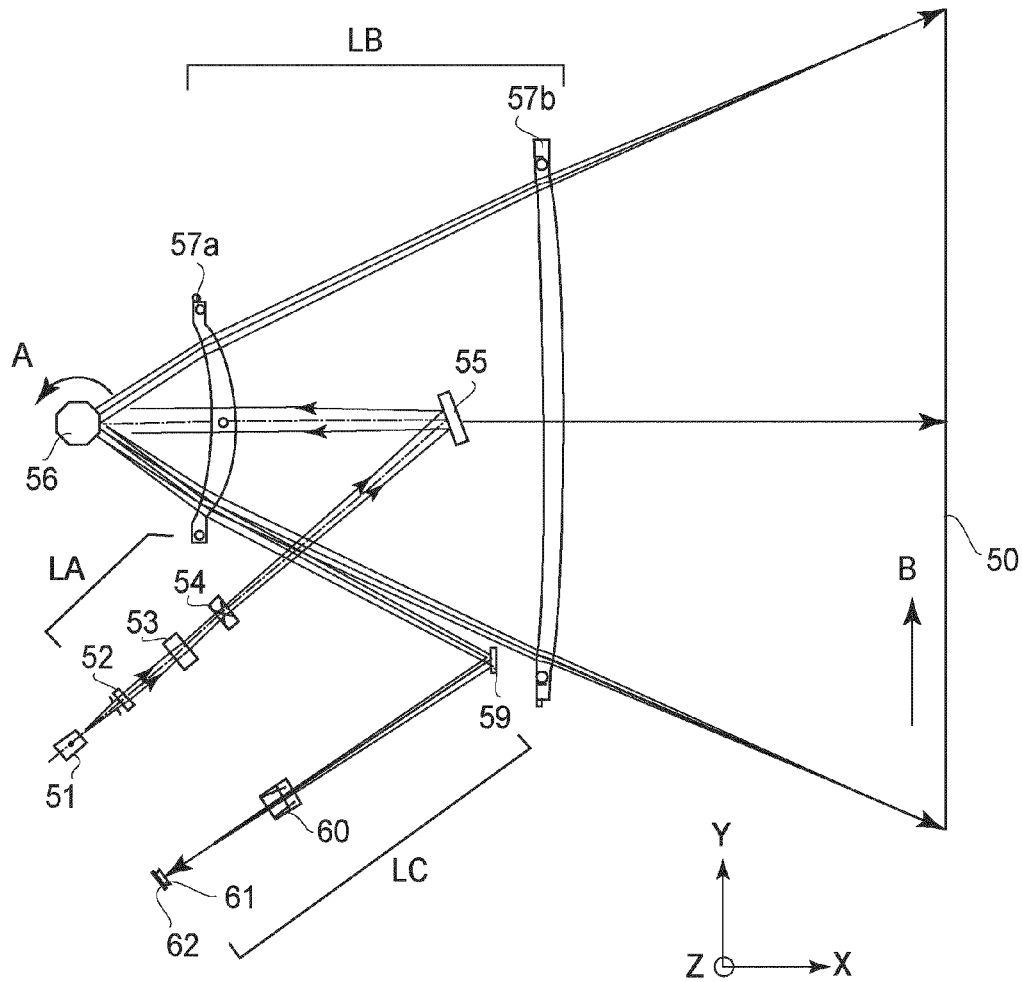
FIG. 15 is a main-scan sectional view of a fourth embodiment of the present invention.
Figure 16:
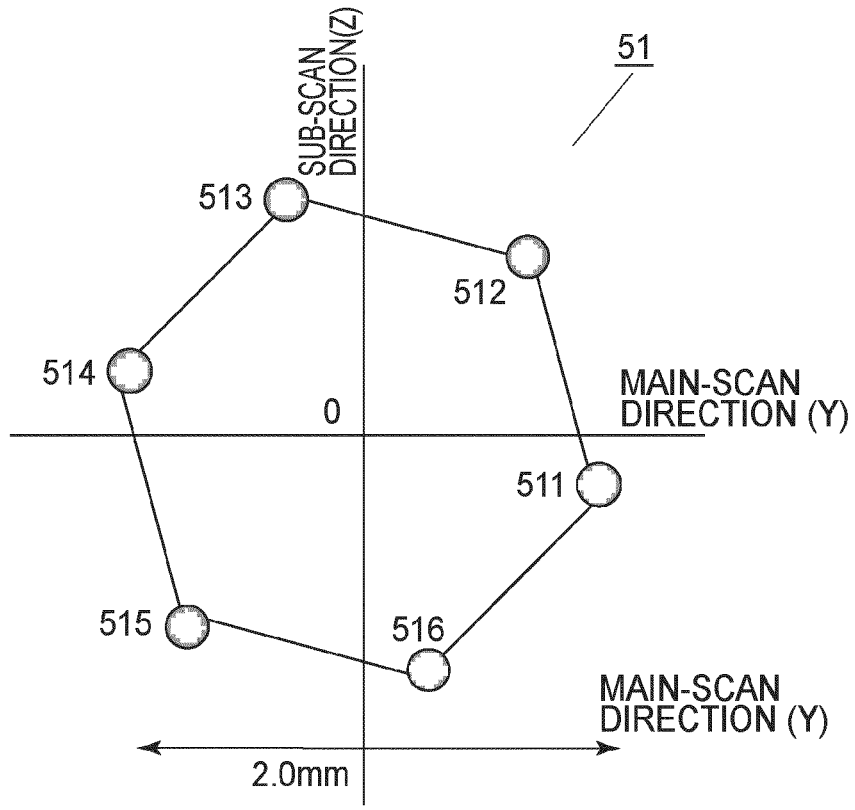
FIG. 16 is a diagram which shows light source means of the fourth embodiment of the present invention.

FIG. 15 is a sectional view (main-scan sectional view) of a main portion of a fourth embodiment of the present invention, along a main-scan direction. FIG. 16 is a schematic diagram of the light source means 51 shown in FIG. 15.

In FIG. 15 and FIG. 16, like numerals are assigned to components corresponding to those of FIG. 1.

The present embodiment differs from the abovementioned first embodiment in that:

(1) The number of the surfaces of the rotary polygonal mirror;
(2) The printing direction of the image; and
(3) The structure of the light source means.

Other structures and optical functions are similar to the first embodiment and, based on this, similar advantageous effects are obtainable.

Design values of the optical scanning device according to the present embodiment are shown in Table 4 below.

TABLE 4

| | |
|---|---|
| Used wavelength (mm) | 7.85E−07 |
| f-θ lens refractive index | 1.524085 |
| No. of polygon surfaces | 10 |
| Polygon circumscribing radius (mm) | 8.5 |
| Polygon rotational angle (plus/minus deg.) | 16.224 |
| Main-scan direction incidence angle (deg.) | 0 |
| Sub-scan direction incidence angle (deg.) | 0.5 |
| Deflection point - GIR1 (mm) | 4.45E+01 |
| f-θ lens focal length (mm) | 2.76E+02 |

Polygon rotational center coordinates when the deflection point on the axial principal ray is taken as zero

| | |
|---|---|
| X | −8.084 |
| Y | 0 |

| Type | R1 surface | | | R2 surface | | | |
|---|---|---|---|---|---|---|---|
| ST2 | Scan starting side (s) | | Scan ending side (e) | | Scan starting side (s) | | Scan ending side (e) |
| Main scan | d | | 8.50E+00 | | d | | 1.205E+02 |
| | R | −1.05E+02 | | | R | −6.06E+01 | |
| | K | 3.04E+00 | K | 3.04E+00 | K | −3.01E−01 | K | −3.01E−01 |
| | B4 | 6.60E−07 | B4 | 6.60E−07 | B4 | 2.61E−07 | B4 | 2.61E−07 |
| | B6 | −1.94E−10 | B6 | −1.94E−10 | B6 | −8.85E−11 | B6 | −8.85E−11 |
| | B8 | 5.92E−14 | B8 | 5.92E−14 | B8 | −5.65E−14 | B8 | −5.66E−14 |
| | B10 | 0.00E+00 | B10 | 0.00E+00 | B10 | 0.00E+00 | B10 | 0.00E+00 |
| Sub scan | r | 1.00E+03 | r | | r | 1.00E+03 | r | |
| | D2 | 0.00E+00 | D2 | 0.00E+00 | D2 | 0.00E+00 | D2 | 0.00E+00 |
| | D4 | 0.00E+00 | D4 | 0.00E+00 | D4 | 0.00E+00 | D4 | 0.00E+00 |
| | D6 | 0.00E+00 | D6 | 0.00E+00 | D6 | 0.00E+00 | D6 | 0.00E+00 |
| | D8 | 0.00E+00 | D8 | 0.00E+00 | D8 | 0.00E+00 | D8 | 0.00E+00 |
| | D10 | 0.00E+00 | D10 | 0.00E+00 | D10 | 0.00E+00 | D10 | 0.00E+00 |

| Type | R3 surface | | | R4 surface | | | |
|---|---|---|---|---|---|---|---|
| ST2 | Scan starting side (s) | | Scan ending side (e) | | Scan starting side (s) | | Scan ending side (e) |
| Main scan | d | | 5.50E+00 | | d | | 1.50E+02 |
| | R | −1.11E+03 | | | R | 6.14E+04 | |
| | K | 0.00E+00 | K | 0.00E+00 | K | −3.87E+04 | K | −3.87E+04 |
| | B4 | 0.00E+00 | B4 | 0.00E+00 | B4 | −7.66E−08 | B4 | −7.66E−08 |
| | B6 | 0.00E+00 | B6 | 0.00E+00 | B6 | 2.82E−12 | B6 | 2.82E−12 |
| | B8 | 0.00E+00 | B8 | 0.00E+00 | B8 | −7.62E−17 | B8 | −7.62E−17 |
| | B10 | 0.00E+00 | B10 | 0.00E+00 | B10 | 0.00E+00 | B10 | 0.00E+00 |

TABLE 4-continued

| | | | | | | | |
|---|---|---|---|---|---|---|---|
| Sub | r | 1.00E+03 | r | | r | −4.41E+01 | r | |
| scan | D2 | 0.00E+00 | D2 | 0.00E+00 | D2 | 2.72E−05 | D2 | 2.72E−05 |
| | D4 | 0.00E+00 | D4 | 0.00E+00 | D4 | −1.91E−09 | D4 | −1.91E−09 |
| | D6 | 0.00E+00 | D6 | 0.00E+00 | D6 | 1.13E−13 | D6 | 1.13E−13 |
| | D8 | 0.00E+00 | D8 | 0.00E+00 | D8 | −2.95E−18 | D8 | −2.95E−18 |
| | D10 | 0.00E+00 | D10 | 0.00E+00 | D10 | 0.00E+00 | D10 | 0.00E+00 |

In FIG. 15 and FIG. 16, denoted at 51 is the light source means which comprise a VCSEL (plane emission laser) having a six-beam semiconductor laser with six light emitting members (511)-(516).

The six light emitting members (511)-(516) are disposed at the apexes of a hexagon, and all of them are placed equidistantly from the optical axis (an axis passing through the point 0 and perpendicular to the sheet of the drawing) of the collimator lens.

This arrangement is to make it sure that the influence of aberration of lenses constituting the optical system with respect to all the light beams becomes even such that any asymmetry is less produced.

Denoted at 52 is a collimator lens which functions to convert the light beam emitted from the light source means 51 into a parallel light beam.

Denoted at 53 is a cylindrical lens which as a predetermined power only in the main-scan section. It provides adjustability of the focus position on the scanned surface 50.

Denoted at 54 is an anamorphic lens which has a negative (concave) power in the main-scan section and, also, a positive (convex) power in the sub-scan section.

The anamorphic lens 54 functions to define a focal line (line image) on the deflecting surface of the rotary polygonal mirror 56 in the sub-scan section. Also, it serves to enlarge the light beam width in the main-scan section and to correct the wavefront aberration, and furthermore to well correct the spot shape on the scanned surface 50.

Denoted at 55 is a reflecting mirror for making the overall system compact. It serves to deflect the light beam passed through the anamorphic lens 4, relative to the main-scan direction, to direct the same to the rotary polygonal mirror 56.

The collimator lens 52, cylindrical lens 53, anamorphic lens 54, and first imaging lens 57a to be described below, are components of the input optical system LA as first optical means.

Denoted at 56 is a rotary polygonal mirror (polygon mirror) as the deflecting means, having ten deflecting surfaces. It is rotated at a constant speed in the direction of an arrow A in the drawing, by driving means (not shown) which comprises a motor.

Denoted at LB is an imaging optical system (f-θ lens system) which comprises first and second imaging lenses (f-θ lenses as anamorphic lenses) 57a and 57b having an aspherical surface shape in the main-scan section.

The imaging optical system LB functions to image, within the main-scan section, the light beam deflectively reflected by the rotary polygonal mirror 56 and based on the imagewise information, as a spot upon the photosensitive drum 50 surface (scanned surface).

Furthermore, the imaging optical system LB is so structured that, in the sub-scan section, an optically conjugate relationship is provided between the deflecting surface of the optical deflector 56 and the photosensitive drum surface 50. With this arrangement, the surface tilt compensation for the optical deflector is accomplished. The first imaging lens 57a constitutes a portion of the input optical system LA.

Furthermore, in the present embodiment, the light beam (incident light flux) to be incident on the rotary polygonal mirror 56 passes through the first imaging lens 57a, and the light beam deflectively reflected by the rotary polygonal mirror 56 is again incident on the first imaging lens 57a (i.e., double-path structure).

Denoted at 50 is a photosensitive drum surface which is the surface to be scanned.

In the present embodiment, the light beams of a number N optically modulated and emitted from the semiconductor laser 51 are converted by the collimator lens 52 into parallel light beams. Subsequently, the light beams are converted once into convergent light beams by the cylindrical lens 53, and then they are incident on the anamorphic lens 54.

Within the sub-scan section, the light beam incident on the anamorphic lens 54 is converged and it passes through the first imaging lens 57a (double-path structure) and is incident on the deflecting surface of the rotary polygonal mirror 56. Hence, a line image (linear image being elongated in the main-scan direction) is formed on the deflecting surface.

Here, the light beam to be incident on the deflecting surface is incident, in the sub-scan section, along an oblique direction with a predetermined angle relative to a normal to the deflecting surface of the rotary polygonal mirror 56 (oblique incidence optical system).

On the other hand, in the main-scan section, six light beams are diverged and pass through the first imaging lens 57a by which they are converted into parallel light beams. Then, the light beams are incident on the deflecting surface of the rotary polygonal mirror 56, from the center of the deflection angle (front incidence).

The light beam width of the parallel light here is so set to be sufficiently wider in the main-scan direction than the facet width of the deflecting surface of the rotary polygonal mirror 56 (over-field optical system (OFS)).

Then, the six light beams deflectively reflected by the deflecting surface are directed through the first and second imaging lenses 57a and 57b to the photosensitive drum surface 50. By rotating the rotary polygonal mirror 56 in the direction of an arrow A, the photosensitive drum surface 50 is optically scanned in the direction of an arrow B (main-scan direction).

In this manner, the image recording is carried out on the photosensitive drum surface 50 which is a recording medium.

Here, in order that the timing of the scan staring position on the photosensitive drum surface 50 is determined before starting the optical scan of the photosensitive drum surface 50, the light beam reflectively deflected by the optical deflector 6 is collected on the synchronism detecting slit 61 surface by means of the synchronism detecting lens 60 and by way of the synchronism detecting mirror 57.

Then, the synchronism detecting light beam collected on the synchronism detecting slit 61 surface is directed to the synchronism detecting sensor 62.

Subsequently, based on the synchronism signal obtained by detecting an output signal from the synchronism detecting sensor 62, a timing signal for the scan staring position of the image recording on the photosensitive drum 50 surface is determined.

Figure 17:
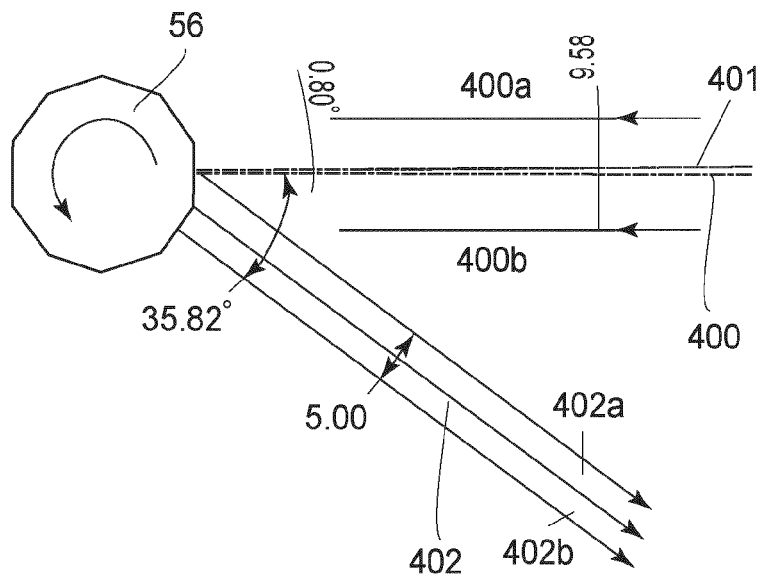
FIG. 17 is an enlarged view of a main portion of the fourth embodiment of the present invention.

FIG. 17 is a main-scan sectional view which shows a portion around the optical deflector of the fourth embodiment of the present invention, in an enlarged scale. Specifically, it illustrates the relationship between the light beam directed to the synchronism detecting sensor and the deflecting surface of the optical deflector.

In FIG. 17, denoted at 400 is an optical axis of the input optical system LA. The light beam from the input optical system LA is being incident with a width greater than the width of the deflecting surface of optical deflector 56 in the main-scan direction.

Denoted at 401 is the light beam from the light emitting member (1) of the light source means 51. Denoted at 402 is a synchronism detecting light beam having a light beam width (the width of the light ray 402a and the light ray 402b) of 5.0 mm.

Furthermore, the deflection angle of the synchronism detecting light beam 402 is 35.82 deg.

As shown in above FIG. 16, the synchronism detecting light beam 402 goes by way of the synchronism detecting mirror 59 and the synchronism detecting lens 60, and it is imaged on the synchronism detecting slit 61.

In the present embodiment, the synchronism is detected on the basis of the light beam from the light emitting member (511) having least light quantity decrease, like the second embodiment described hereinbefore. The detection timing is determined by a similar structure as the first embodiment previously described.

More specifically, the synchronism detection is carried out by using the light beam from the light emitting member (511) which is located rearmost in the main-scan direction.

The distance $\Delta L2$ between the peak intensity of the light beam emitted from the light emitting member (511) and the peak intensity of the light beam emitted from the light emitting member (514), upon the deflecting surface of this embodiment, is given by:

$$\Delta L2 = X \cdot W/f_{ins} = 13.53 \text{ mm}$$

If the FFP (full-angle half-maximum) of the light source means 51 is equal to 10 deg., the light quantity of the light beam to be emitted from the light emitting member (511) at the image height is 5.8 times higher than the light beam to be emitted from the light emitting member (514). Thus, more stable synchronism detection is accomplished as compared with a case where the detection is made based on the light beam emitted from the light emitting member (514).

Next, a numerical example of parameters of the above conditional expression (1) in this embodiment will be described.

$\theta_{BD} = 35.82$ deg.
$f_{f\theta} = 275.46$ mm
$W = 2$ mm
$f_{col} = 71.7$ mm
$Y_W = 304$ mm From this, the image height $|Y_{BD}|$ at the left-hand side of the conditional expression (1) as well as the value of $W \times f_{f\theta}/f_{col} + |Y_W|/2$ at the right-hand side thereof are:

Left hand side = $275.46 \times 35.82 \times \pi/180 = 172.21$

Right hand side = $2 \times 275.46/71.7 + 304/2 = 159.7$

This satisfies the above conditional expression (1).

If the conditional expression (1) is unsatisfied, the light beam emitted from the light emitting member 514 arrives at the image writing start position before the light beam emitted from the light emitting member 511 is incident on the synchronism detecting sensor 62, such that the writing start position cannot be registered any more.

In the present embodiment as described above, in an optical scanning device using light source means 51 having six light emitting members as described above, the light emitting members are disposed equidistantly from the optical axis and are arrayed to make uniform the optical characteristics of these light emitting members. The synchronism detection is carried out based on the light beam having lowest light quantity decrease.

Furthermore, the components of the input optical system LA are so configured that the quantity of the light beam incident on the synchronism detecting sensor 62 is kept at a level higher than a predetermined one.

With this arrangement, the present embodiment accomplishes an optical scanning device by which, even if wide field-angle scan is performed by use of a small-diameter rotary polygonal mirror, deviation of the printing position in the main-scan direction is avoided and thus a high-definition image is obtainable.

Furthermore, when the device is incorporated into a color image forming apparatus, the present embodiment provides a color image forming apparatus by which a high-definition color image is obtainable without a color drift.

It should be noted here that the light source means of the present embodiment is not limited to the one disclosed here. It may be one described with reference to the first, second or third embodiment.

To the contrary, the light source means of the present embodiment may be incorporated into the first, second or third embodiment.

Figure 18:
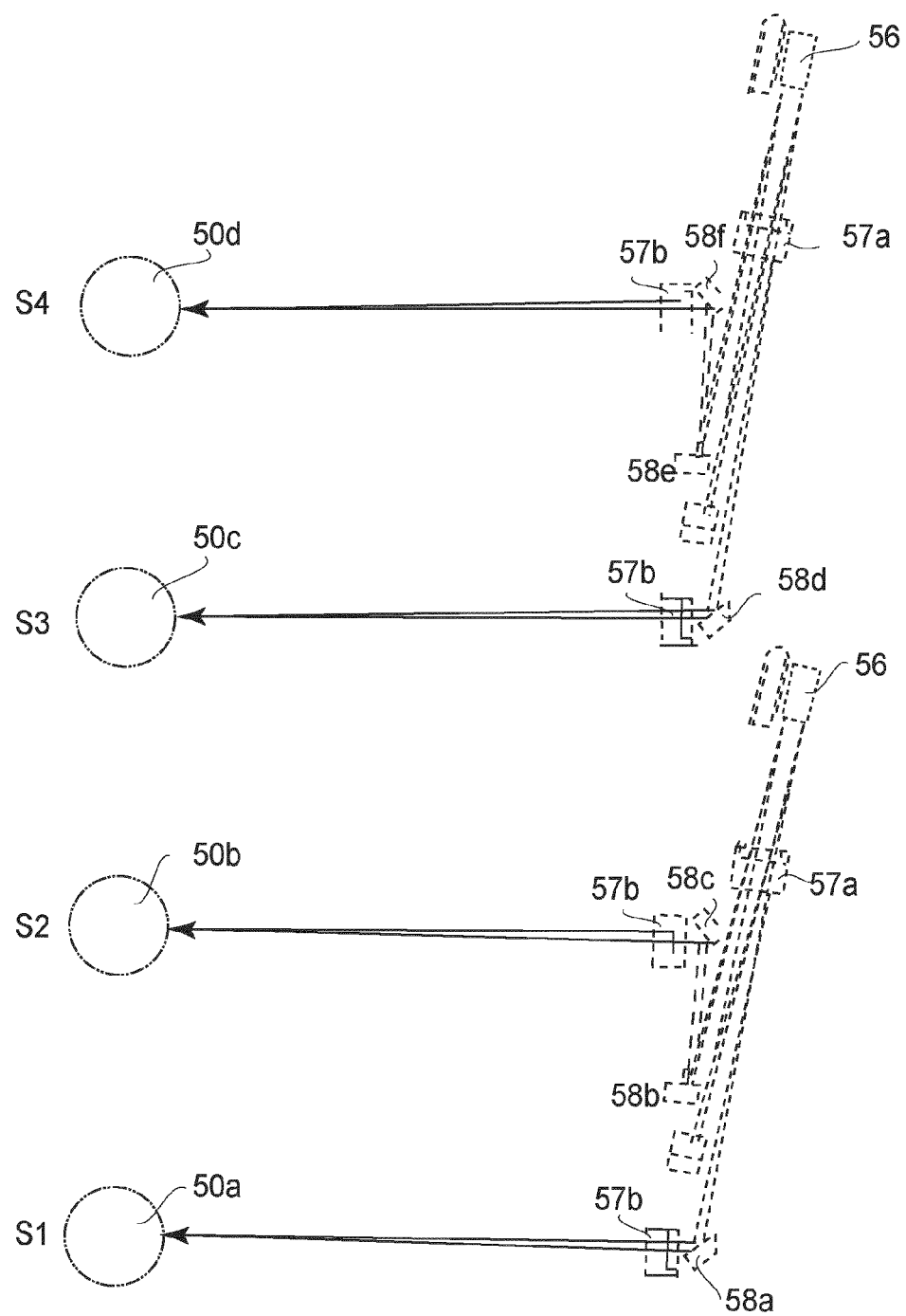
FIG. 18 is a sub-scan sectional view of the fourth embodiment of the present invention.

FIG. 18 is a sectional view (sub-scan sectional view) in the sub-scan direction of a main portion of an image forming apparatus (color image forming apparatus) which used a plurality of optical scanning devices as illustrated in FIG. 15.

The image forming apparatus of the present embodiment comprises one and the same rotary polygonal mirror 56 and four optical scanning devices (stations) S1, S2, S3 and S4 wherein the rotary polygonal mirror 56 is shared by two of them.

By means of the same rotary polygonal mirror 56, photosensitive drum surfaces 50a, 50b, 50c and 50d (different scanned surfaces) are scanned, and a color image is produced based on multiplex development.

Although two rotary polygonal mirrors 56 are illustrated in FIG. 18, the rotary polygonal mirror 56 is comprised to two, upper and lower steps such that each of the different deflecting surfaces of the rotary polygonal mirror 56 deflectively reflects six light beams.

In FIG. 18, denoted a 56 is a rotary polygonal mirror (polygon mirror) as a common deflecting means, which is rotated at a constant speed in a predetermined direction by driving means (not shown) such as a motor.

Denoted at 57a is a first imaging lens provided at each station, and denoted at 57b is a second imaging lens provided similarly at each station.

In this embodiment, these two, i.e. first and second imaging lenses 57a and 57b constitute the imaging optical system of each station S1, S2, S3 or S4.

Denoted at 58a is a reflecting mirror which is provided at the station S1. Denoted at 58b and 58c are reflecting mirrors which are provided at the station S2. Denoted at 58d is a reflecting mirror which is provided at the station S3, and denoted at 58e and 58f are reflecting mirrors which are provided at the station S4.

These reflecting mirror 58a-58f are disposed at the light path from the rotary polygonal mirror 56 to the scanned surfaces 50a-50d and at a side of the second imaging lens 57b facing the rotary polygonal mirror 56 side.

Denoted at 50a, 50b, 50c and 50d are photosensitive drum surfaces, respectively, as the scanned surfaces corresponding to the stations S1, S2, S3 and S4, respectively.

The image forming apparatus of the present embodiment is comprised of a plurality of stations (optical scanning devices), and it is so structured that, by dividing the light beam in the sub-scan direction upon the facet of the rotary polygonal mirror, the light beam passed through the first imaging lens 57a can be easily divided and directed toward different scanned surfaces.

Furthermore, since the first imaging lens 57a is shared by two stations S1 and S2 (S3 and S4), the number of lens elements can be reduced, and simplification of the overall system is ensured.

If in the present embodiment a multi-beam light source is used in an OFS optical system as has been described with reference to the second embodiment, the optical axis of the input optical system LA and the intensity centre position of the light beam will be separated from each other, and the amount of separation will increase in proportion to the distance from the rear focal point position of the input optical system to the deflecting surface.

[Embodiment of Image Forming Apparatus]

Figure 19:
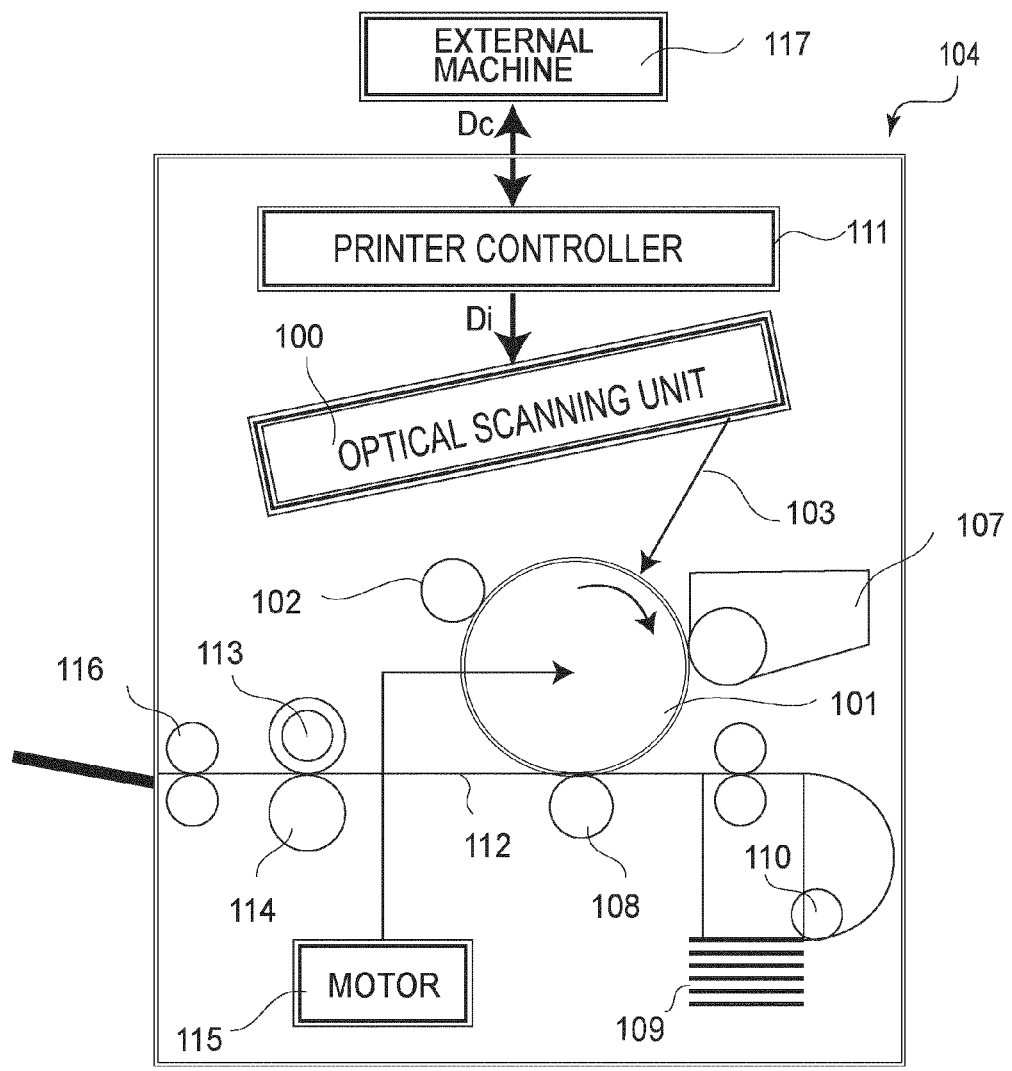
FIG. 19 is a sub-scan sectional view which shows an embodiment of an image forming apparatus of the present invention.

FIG. 19 is a schematic and sectional view, in the sub-scan direction, of a main portion of an image forming apparatus according to an embodiment of the present invention. Denoted generally at 104 in the drawing is the image forming apparatus.

The image forming apparatus 104 receives code data Dc supplied thereto from an external machine 117 such as a personal computer, for example. The code data Dc is then transformed by a printer controller 111 inside the apparatus, into imagewise data (dot data) Di.

The imagewise data Di is then inputted into an optical scanning unit 100 which is configured in accordance with any one of the preceding embodiments described hereinbefore. The optical scanning unit 100 produces a light beam 103 having been modulated in accordance with the imagewise data Di, and with this light beam 103, the photosensitive surface of a photosensitive drum 101 is scanned in the main-scan direction.

The photosensitive drum 101 which is an electrostatic latent image bearing member (photosensitive member) is rotated clockwise by means of a motor 115. Through this rotation, the photosensitive surface of the photosensitive drum 101 is moved relatively to the light beam 103, in the sub-scan direction which is orthogonal to the main-scan direction.

Disposed just above the photosensitive drum 101 is a charging roller 102 which is in contact with the photosensitive drum surface to electrically charge the drum surface uniformly. Onto the photosensitive drum 101 surface having been electrically charged by the charging roller 102, the light beam 103 being scanned by the optical scanning unit 100 is projected.

As described above, the light beam 103 has been modulated in accordance with the imagewise data Di. By irradiating the photosensitive drum 101 with this light beam 103, an electrostatic latent image is formed on the photosensitive drum 101 surface. The electrostatic latent image thus formed is then developed into a toner image, by means of a developing device 107 which is provided at a position downstream of the irradiation position of the light beam 103 with respect to the rotational direction of the photosensitive drum 101 and which is in contact with the photosensitive drum 101.

The toner image thus developed by the developing device 107 is transferred onto a transfer sheet (transfer material) 112 below the photosensitive drum 101, by means of a transfer roller 108 which is disposed opposed to the photosensitive drum 101.

Transfer sheets 112 are stored in a sheet cassette 109 in front of (at the right-hand side as viewed in FIG. 19) the photosensitive drum, but these can be supplied manually. There is a sheet supplying roller 110 at an end portion of the sheet cassette 109, for supplying each sheet 112 in the cassette 109 into a sheet supply path.

The paper sheet 112 having an unfixed toner image transferred thereto in the manner described above is conveyed to a fixing device behind (at the left-hand side as viewed in FIG. 19) the photosensitive drum 101. The fixing device comprises a fixing roller 113 having a built-in fixing heater (not shown) and a pressing roller 114 disposed to be press-contacted to the fixing roller 113. The transfer sheet 112 supplied from the image transfer station is heated under pressure at the press contact area between the fixing roller 113 and the pressing roller 114, whereby the unfixed toner image on the transfer sheet 112 is fixed thereon.

Behind the fixing roller 113, there are sheet discharging rollers 116 which function to discharge the image-fixed sheet 112 out of the image forming apparatus.

While not shown in FIG. 19, the print controller 111 has various functions in addition to the data conversion function described hereinbefore, such as for controlling a motor 115 or any other components inside the image forming apparatus as well as a polygon motor inside the optical scanning unit (to be described later).

There is no particular limitation with regard to the recording density of the image forming apparatus to be used in the present invention. However, since the higher the recording density is, the higher the required image quality is, the structures according to the first and second embodiments of the present invention will be more effective when they are introduced into an image forming apparatus of a resolution 1200 dpi or higher.

[Embodiment of Color Image Forming Apparatus]

Figure 20:
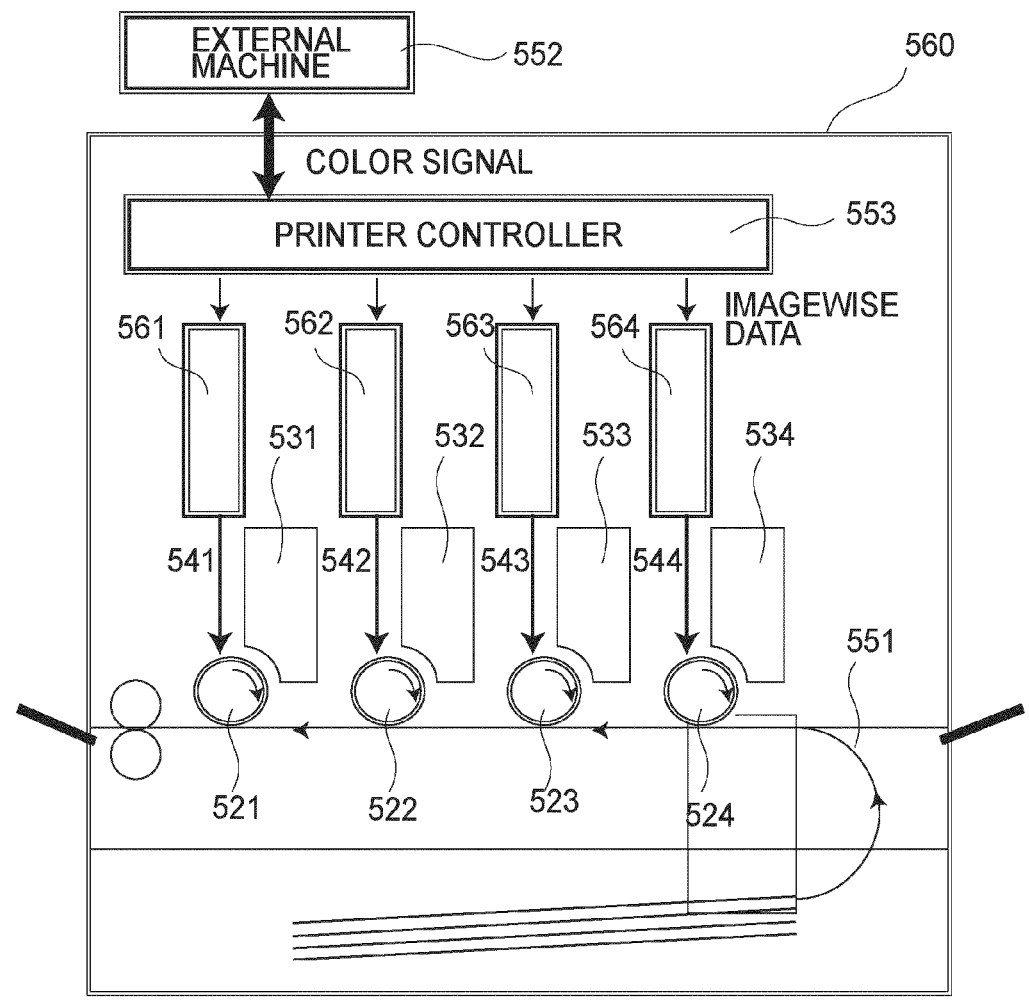
FIG. 20 is a schematic diagram of a main portion of a color image forming apparatus according to an embodiment of the present invention.

FIG. 20 is a schematic view of a main portion of a color image forming apparatus according to an embodiment of the present invention. This embodiment is directed to a tandem type color image forming apparatus in which four optical scanning devices are provided so as to record imagewise data upon the surfaces of corresponding photosensitive drums (image bearing members) in parallel to each other.

In FIG. 20, denoted generally at 560 is a color image forming apparatus, and denoted at 561, 562, 563 and 564 are optical scanning devices having a structure according to the first or second embodiment. Denoted at 521, 522, 523 and 524 are photosensitive drums (image bearing members), and denoted at 531, 532, 533 and 534 are developing devices, respectively. Denoted at 551 is a conveyance belt.

Although not shown in FIG. 20, the image forming apparatus further comprises a transfer device for transferring the toner image developed by the developing device to a transfer material, and a fixing device for fixing the transferred toner image on the transfer sheet.

In FIG. 20, the color image forming apparatus 560 receives color signals of R (red), G (green) and B (blue) supplied thereto from an outside machine 552 such as a personal computer, for example. These color signals are transformed by means of a printer controller 553 inside the image forming apparatus, into imagewise data (dot data) corresponding to C (cyan), M (magenta), Y (yellow) and B (black).

These imagewise data are inputted into the optical scanning devices 561, 562, 563 and 564, respectively. In response, these optical scanning devices produce light beams 541, 542, 543 and 544 having been modulated in accordance with the associated imagewise data. Through these light beams, the photosensitive surfaces of the photosensitive drums 521, 522, 523 and 524 are scanned in the main-scan direction.

In the color image forming apparatus of this embodiment, four optical scanning devices 561, 562, 563 and 564 are provided and these correspond to colors of C (cyan), M (magenta), Y (yellow) and B (black), respectively. These scanning devices are operable in parallel to each other to record imagewise signals upon the surfaces of the photosensitive drums 521, 522, 523 and 524, respectively, so that a color image can be printed at high speed.

As described, the color image forming apparatus of this embodiment uses four optical scanning devices 561, 562, 563 and 564 to produce latent images for different colors upon the surfaces of corresponding photosensitive drums 521, 522, 523 and 524, respectively, by use of light beams based on respective image data. After that, these images are superposedly transferred onto a recording sheet, whereby a single full-color image is produced thereon.

As regards the outside machine 552, a color image reading machine having a CCD sensor, for example, may be used. In that occasion, this color image reading machine and the color image forming apparatus 560 will provide a color digital copying machine.

[Embodiment of Color Image Forming Apparatus]

Figure 21:
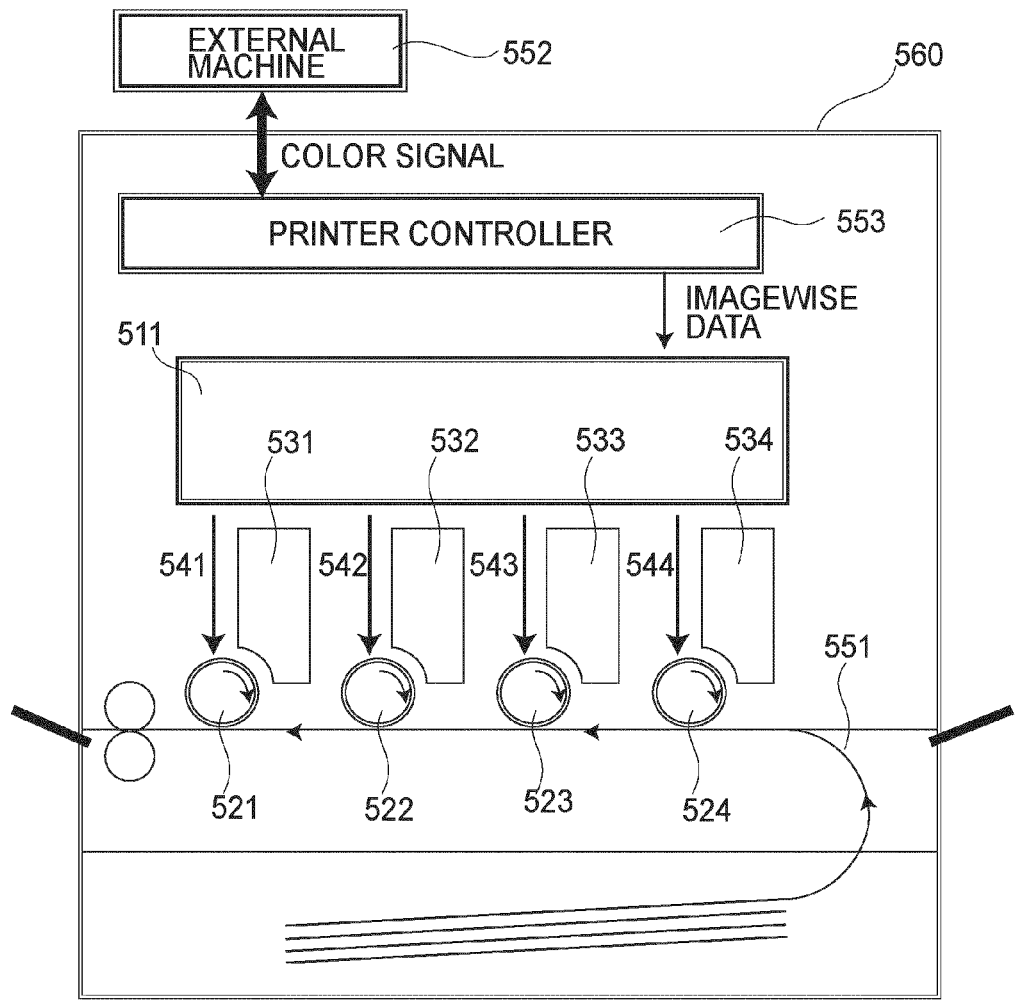
FIG. 21 is a schematic diagram of a main portion of a color image forming apparatus according to an embodiment of the present invention.

FIG. 21 is a schematic view of a main portion of a color image forming apparatus according to another embodiment of the present invention.

In FIG. 21, like numerals are assigned to the components corresponding to those of FIG. 20.

In FIG. 21, denoted at 511 is an optical scanning device having a structure according to the fourth embodiment of the present invention.

The image forming apparatus shown in FIG. 21 comprises an image transfer device (not shown) for transferring a toner image, developed by a developing device, onto a transfer sheet and a fixing device (not shown) for fixing the toner image on the transfer sheet.

In FIG. 20, denoted generally at 560 is a color image forming apparatus, and denoted at 561, 562, 563 and 564 are optical scanning devices having a structure according to the first or second embodiment. Denoted at 521, 522, 523 and 524 are photosensitive drums (image bearing members), and denoted at 531, 532, 533 and 534 are developing devices, respectively. Denoted at 551 is a conveyance belt.

Although not shown in FIG. 20, the image forming apparatus further comprises a transfer device for transferring the toner image developed by the developing device to a transfer material, and a fixing device for fixing the transferred toner image on the transfer sheet.

In FIG. 21, the color image forming apparatus 560 receives color signals of R (red), G (green) and B (blue) supplied thereto from an outside machine 552 such as a personal computer, for example. These color signals are transformed by means of a printer controller 553 inside the image forming apparatus, into imagewise data (dot data) corresponding to C (cyan), M (magenta), Y (yellow) and B (black).

These imagewise data are inputted into the optical scanning device 511. In response, the optical scanning device produces light beams 541, 542, 543 and 544 having been modulated in accordance with the associated imagewise data. Through these light beams, the photosensitive surfaces of the photosensitive drums 521, 522, 523 and 524 are scanned in the main-scan direction.

In the color image forming apparatus of this embodiment, a single optical scanning device is used in relation to colors of C (cyan), M (magenta), Y (yellow) and B (black). This scanning device functions to record imagewise signals upon the surfaces of the photosensitive drums 521, 522, 523 and 524, respectively, so that a color image can be printed at high speed.

As described, the color image forming apparatus of this embodiment uses a single optical scanning device 511 to produce latent images for different colors upon the surfaces of corresponding photosensitive drums 521, 522, 523 and 524, respectively, by use of light beams based on respective image data. After that, these images are superposedly transferred onto a recording sheet, whereby a single full-color image is produced thereon.

As regards the outside machine 552, a color image reading machine having a CCD sensor, for example, may be used. In that occasion, this color image reading machine and the color image forming apparatus 560 will provide a color digital copying machine.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2007-063324 filed Mar. 13, 2007, for which is hereby incorporated by reference.

What is claimed is:

1. An optical scanning device, comprising:
a light source unit having a plurality of light emitting members of a number N, with N being an integer not less than 2, disposed with a tilt with respect to a sub-scan direction and a main-scan direction;
an input optical system configured to direct N light beams emitted by said N light emitting members;
a deflecting unit comprising a deflecting surface and configured to scanningly deflect the N light beams directed to said deflecting unit by said input optical system, wherein the N light beams are eclipsed differently by said deflecting surface of said deflecting unit, such that a predetermined light beam, emitted by a predetermined light emitting member of said N light emitting members, is eclipsed more than other light beams of the N light beams;
a synchronism signal detecting unit configured to detect one of the N light beams scanningly deflected by said deflecting surface so as to produce a synchronization signal for determining writing start timing signals for the N light beams upon a surface to be scanned, wherein the detected light beam is emitted from a light emitting member other than the predetermined light emitting member;
a synchronism detecting optical system configured to direct the N light beams from said deflecting unit to said synchronism signal detecting unit; and
an imaging optical system configured to direct the N light beams scanningly deflected by said deflecting surface to the surface to be scanned,
wherein said deflecting unit is further configured such that a portion of the predetermined light beam is eclipsed by said deflecting surface, and the synchronism detecting optical system is configured such that the eclipsed predetermined light beam is then incident on said synchronism signal detecting unit, and wherein the detected light beam is the light beam of the N light beams which scans the surface to be scanned the latest with respect to the other light beams of the N light beams, and said synchronism signal detecting unit produces the synchronization signal from which the writing start timing signals for the N light beams are determined in conjunction with respective premeasured time delays.

2. An optical scanning device according to claim 1, wherein said deflecting unit comprises a rotary polygonal mirror having a plurality of deflecting surfaces, including the deflecting surface, wherein the detected light beam is one which scans the surface to be scanned last with respect to the main-scan direction.

3. An optical scanning device according to claim 1, wherein when:

an image height for detecting a writing start timing of said synchronism detecting optical system when converted upon the surface to be scanned is denoted by $Y_{BD}$, a maximum distance of said N light emitting members in the main-scan direction is denoted by W, a focal length of said input optical system in a main-scan section is denoted by $f_{col}$, a focal length of said imaging optical system in the main-scan section is denoted by $f_{f\theta}$, and an effective image width on the surface to be scanned is denoted by $Y_W$, a condition $|Y_{BD}| \geq W \times f_{f\theta}/f_{col} + |Y_W/2|$ is satisfied.

4. An optical scanning device according to claim 1, wherein said synchronism signal detecting unit is arranged such that the detected light beam is one that provides a largest light quantity on said synchronism signal detecting unit.

5. An optical scanning device according to claim 1, wherein, in a main-scan section, a width of the N light beams is wider than a width of said deflecting surface of said deflecting unit in the main-scan direction.

6. An image forming apparatus, comprising:

an optical scanning device as recited in claim 1;

a photosensitive member disposed at the surface to be scanned;

a developing device for developing an electrostatic latent image formed on said photosensitive member with the N light beams scanningly deflected by said optical scanning device, to produce a toner image;

a transferring device for transferring the developed toner image onto a transfer material; and a fixing device for fixing the transferred toner image, on the transfer material.

7. An image forming apparatus, comprising:

an optical scanning device as recited in claim 1; and a printer controller for converting code data supplied from an outside machine into an imagewise signal and for inputting the imagewise signal into said optical scanning device.

8. An optical scanning device, comprising: a light source unit having a plurality of light emitting members of a number N, with N being an integer not less than 2, disposed with a tilt with respect to a sub scan direction and a main scan direction;

an input optical system configured to direct N light beams emitted by said N light emitting members;

a deflecting unit comprising a deflecting surface and configured to scanningly deflect the N light beams directed to said deflecting unit by said input optical system, wherein the N light beams are eclipsed differently by said deflecting surface of said deflecting unit, such that a predetermined light beam, emitted by a predetermined light emitting member of said N light emitting members, is eclipsed more than other light beams of the N light beams;

a synchronism signal detecting unit configured to detect one of the N light beams scanningly deflected by said deflecting surface so as to produce a synchronization signal for determining writing start timing signals for the N light beams upon a surface to be scanned, wherein the detected light beam is emitted from a light emitting member other than the predetermined light emitting member;

a synchronism detecting optical system configured to direct the N light beams from said deflecting unit to said synchronism signal detecting unit; and an imaging optical system configured to direct the N light beams scanningly deflected by said deflecting surface to the surface to be scanned, wherein said synchronism signal detecting unit produces the synchronization signal from which the writing start timing signals for the N light beams are determined in conjunction with respective premeasured time delays.

* * * * *